(12) United States Patent
Ootorii

(10) Patent No.: US 10,805,547 B2
(45) Date of Patent: Oct. 13, 2020

(54) IMAGING DEVICE HAVING AN ELONGATED BENDABLE SECTION CARRIES AN IMAGING SECTION TO CAPTURE AN IMAGE IN A PREDETERMINED DIRECTION

(71) Applicant: Sony Corporation, Tokyo (JP)

(72) Inventor: Hiizu Ootorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/269,563

(22) Filed: Feb. 7, 2019

(65) Prior Publication Data

US 2019/0191097 A1 Jun. 20, 2019

Related U.S. Application Data

(62) Division of application No. 15/542,576, filed as application No. PCT/JP2015/086555 on Dec. 28, 2015, now abandoned.

(30) Foreign Application Priority Data

Mar. 4, 2015 (JP) .................................. 2015-042067

(51) Int. Cl.
 *H04N 5/232* (2006.01)
 *G03B 15/00* (2006.01)
 (Continued)

(52) U.S. Cl.
 CPC ......... *H04N 5/23296* (2013.01); *G03B 15/00* (2013.01); *G03B 17/00* (2013.01);
 (Continued)

(58) Field of Classification Search
 CPC .............. H04N 5/23296; H04N 5/225; H04N 5/23203; H04N 5/2253; H04N 5/2628;
 (Continued)

(56) References Cited

U.S. PATENT DOCUMENTS 4,477,049 A * 10/1984 Davis ..................... A47G 33/12
 248/524
5,531,664 A 7/1996 Adachi et al.
 (Continued)

FOREIGN PATENT DOCUMENTS

JP 2000-125157 A 4/2000
JP 2000-342527 A 12/2000
 (Continued)

OTHER PUBLICATIONS

Extended Search Report issued in European Application 15884041.3-1022 dated Jul. 2, 2018.
 (Continued)

*Primary Examiner* — Luong T Nguyen
(74) *Attorney, Agent, or Firm* — Xsensus LLP

(57) ABSTRACT

Imaging device including an elongated bendable section, a reinforcing section that is arranged on an end portion of the bendable section in an elongated direction in which the bendable section extends, the reinforcing section having higher rigidity than the bendable section, and an imaging section capable of capturing an image in the elongated direction with respect to the reinforcing section. The bendable section is able to store a power source in at least a part of the bendable section.

13 Claims, 26 Drawing Sheets

(51) Int. Cl.
*G03B 17/00* (2006.01)
*G03B 17/04* (2006.01)
*G03B 17/56* (2006.01)
*H04N 5/225* (2006.01)
*H04N 5/262* (2006.01)

(52) U.S. Cl.
CPC ............. *G03B 17/04* (2013.01); *G03B 17/56* (2013.01); *H04N 5/225* (2013.01); *H04N 5/2253* (2013.01); *H04N 5/23203* (2013.01); *H04N 5/23241* (2013.01); *H04N 5/2628* (2013.01)

(58) Field of Classification Search
CPC ........ G03B 15/00; G03B 17/00; G03B 17/04; G03B 17/56
See application file for complete search history.

(56) References Cited

U.S. PATENT DOCUMENTS

| | | | |
|---|---|---|---|
| 5,662,587 A | | 9/1997 | Grundfest et al. |
| 5,701,531 A | * | 12/1997 | Tanaka .................... G03B 17/24 396/319 |
| 6,043,839 A | * | 3/2000 | Adair ................. A61B 1/00135 257/E25.032 |
| 6,069,698 A | * | 5/2000 | Ozawa ................ A61B 5/0062 356/511 |
| 6,162,171 A | | 12/2000 | Ng et al. |
| D451,939 S | * | 12/2001 | Roh .............................. D16/202 |
| 6,547,723 B1 | | 4/2003 | Ouchi |
| 6,929,600 B2 | | 8/2005 | Hill |
| 7,976,459 B2 | | 7/2011 | Laser |
| 8,896,681 B2 | * | 11/2014 | Ishida .................... G02B 7/025 348/76 |
| 2004/0047052 A1 | * | 3/2004 | Zadro .................... A45D 42/16 359/855 |
| 2004/0111012 A1 | | 6/2004 | Whitman |
| 2004/0211868 A1 | * | 10/2004 | Holmes .................. F16M 11/40 248/231.71 |
| 2006/0004258 A1 | | 1/2006 | Sun et al. |
| 2006/0005258 A1 | * | 1/2006 | Hirose ................ H04L 63/0457 726/27 |
| 2006/0108485 A1 | * | 5/2006 | Enderle .................. F16M 11/40 248/160 |
| 2009/0208143 A1 | | 8/2009 | Yoon et al. |
| 2010/0087708 A1 | | 4/2010 | Chen et al. |
| 2015/0011824 A1 | * | 1/2015 | Wilkinson ............... A61B 1/05 600/109 |

FOREIGN PATENT DOCUMENTS

| | | |
|---|---|---|
| JP | 2002-199530 A | 7/2002 |
| JP | 2004-093898 A | 3/2004 |
| JP | 2012-044566 A | 3/2012 |

OTHER PUBLICATIONS

International Search Report dated Mar. 15, 2016 in PCT/JP2015/086555 filed Dec. 28, 2015.

* cited by examiner

| G | B | G | B |
|---|---|---|---|
| R | IR | R | IR |
| G | B | G | B |
| R | IR | R | IR |

IMAGING DEVICE HAVING AN ELONGATED BENDABLE SECTION CARRIES AN IMAGING SECTION TO CAPTURE AN IMAGE IN A PREDETERMINED DIRECTION

CROSS-REFERENCE TO RELATED APPLICATIONS

This application is a divisional of U.S. patent application Ser. No. 15/542,576, filed on Jul. 10, 2017, which is a National Stage Entry of International Patent Application No. PCT/JP2015/086555, filed on Dec. 28, 2015, and claims priority to Japanese Patent Application No. 2015-042067, filed in the Japanese Patent Office on Mar. 4, 2015, the entire contents of which is incorporated herein by reference in its entirety.

TECHNICAL FIELD

The present disclosure relates to an imaging device.

BACKGROUND ART

In recent years, imaging devices such as digital still cameras and digital video cameras (hereinafter also referred to collectively as "digital cameras") have come into widespread use, and types thereof have also diversified. For example, Patent Literature 1 discloses an example of an imaging device configured as a digital camera.

Particularly, in recent years, with the size reduction of imaging elements and optical systems, it has become possible to reduce the size of imaging devices, and among small-sized imaging devices, imaging devices which include a main body worn on a part of a human body and are capable of capturing an image in a hands-free manner such as so-called wearable terminals have also been proposed.

CITATION LIST

Patent Literature

Patent Literature 1: JP 2012-44566A

DISCLOSURE OF INVENTION

Technical Problem

As described above, the purpose (that is, usage scene) of imaging devices such as digital cameras has diversified, and in recent years, imaging devices that can be used for more purposes and are more convenient have been desired to be proposed.

In this regard, the present disclosure proposes an imaging device that can be applied for various purposes in more suitable forms.

Solution to Problem

According to the present disclosure, there is provided an imaging device including: an elongated bendable section configured to be bendable; a reinforcing section that is arranged on an end portion of the bendable section in an elongated direction in which the bendable section extends, the reinforcing section having higher rigidity than the bendable section; and an imaging section that is held to be able to capture an image in the elongated direction with respect to the reinforcing section. The bendable section is configured to be able to store a power source in at least a part of the bendable section.

Advantageous Effects of Invention

As described above, according to the present disclosure, an imaging device that can be applied for various purposes in more suitable forms is provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is a diagram illustrating an example of an imaging element including a detecting element for detecting an infrared signal.

MODE(S) FOR CARRYING OUT THE INVENTION

Figure 1:
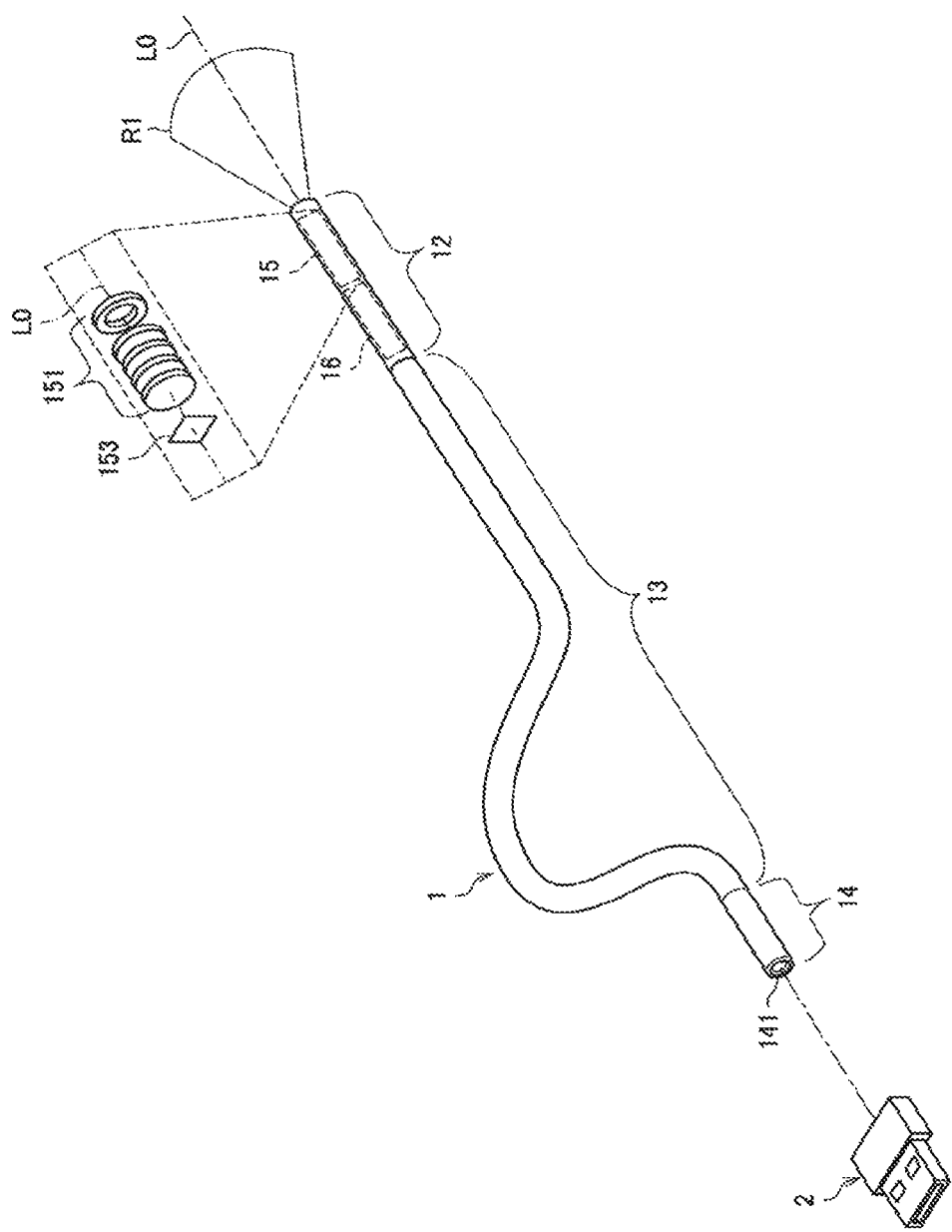
FIG. 1 is an explanatory diagram for describing an example of a schematic configuration of an imaging device according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, description will proceed in the following order.
1. Imaging device
1.1. Schematic configuration of imaging device
1.2. Configuration of bendable section
1.3. Configuration for bending by drive section
1.4. External unit
2. Modified examples
2.1. First modified example: follow-up control based on detection of wireless signal
2.2. Second modified example: follow-up control based on detection of infrared light
2.3. Third modified example: follow-up control using three-point survey
3. Application examples
4. Conclusion
<1. Imaging Device>
[1.1. Schematic Configuration of Imaging Device]

First, an example of a schematic configuration of an imaging device according to one embodiment of the present disclosure will be described with reference to FIG. 1. FIG. 1 is an explanatory diagram for describing an example of a schematic configuration of an imaging device according to the present embodiment.

As illustrated in FIG. 1, an imaging device 1 according to the present embodiment includes an elongated (so-called cable-like) bendable section 13 configured to be bendable and reinforcing sections 12 and 14 which are arranged on end portions in a longitudinal direction in which the bendable section 13 extends. Hereinafter, the longitudinal direction in which the bendable section 13 extends is also referred to as an "axial direction L0."

An imaging section 15 and a circuit section 16 are arranged in the reinforcing section 12. For example, in the example illustrated in FIG. 1, the imaging section 15 and the circuit section 16 are installed inside the reinforcing section 12. In addition, a connection terminal 141 for connecting the imaging device 1 with an external unit 2 (for example, an external device or an optional unit) different from the imaging device 1 may be arranged in the reinforcing section 14. For example, in the example illustrated in FIG. 1, the connection terminal 141 is arranged on an end portion of the reinforcing section 14 in the axial direction L0 so that the external unit 2 is connected to the reinforcing section 14 in the axial direction L0.

The bendable section 13 is configured to have a characteristic in which it is deformed and bent by external pressure and retains the deformed shape even after the external pressure is eliminated. Hereinafter, the characteristic of being deformed by external pressure and retaining the deformed shape even after the external pressure is eliminated is also referred to as "plastic deformation." As a specific example, the bendable section 13 may be formed to include a plastic-deformable shape-retaining material. As another example, the bendable section 13 may be configured to be bendable and plastic-deformable by a structure of extending in the longitudinal direction like a so-called bellows-like (bellows-shaped) structure or a coil-like structure.

The bendable section 13 is configured to be able to store a power source for supplying electric power to the imaging section 15 and the circuit section 16 to be described later. As a specific example, the bendable section 13 may include a battery having a cable shape such as a circular cross-sectional shape or a flat cable shape. As another example, a so-called battery box for incorporating a battery therein may be arranged in a part of the bendable section 13. As a battery, for example, a so-called button-like battery can be applied.

Further, various kinds of wirings (for example, wiring for electrical connection and the like) for transmitting and receiving information between various kinds of components (for example, the imaging section 15 and the circuit section 16) arranged in the reinforcing section 12 and various kinds of components (for example, the connection terminal 141) arranged in the reinforcing section 14 are arranged in the bendable section 13. Through this configuration, various kinds of components arranged in the reinforcing section 12 can perform transmission and reception of information with the external unit 2 connected to the connection terminal 141 via the wirings arranged in the bendable section 13. Further, for example, a charging unit for charging the power source (battery) stored in the bendable section 13 may be connected to the connection terminal 141 as the external unit 2. Accordingly, it is possible to charge the power source stored in bendable section 13 with electric power.

Further, when the power source is arranged (stored) in a part of the bendable section 13, an arrangement location is not particularly limited and may be appropriately changed, for example, in accordance with a use form of the imaging device 1 that is supposed.

As a specific example, the power source may be stored near the reinforcing section 14, that is, in a portion of the bendable section 13 in which the connection terminal 141 for connecting the external unit 2 is arranged. In this case, for example, when the charging unit is connected to the connection terminal 141 as the external unit 2, it is possible to suppress power interruption by the wiring or the like when the power source stored in the bendable section 13 is charged with electric power.

As another example, the power source may be stored near the reinforcing section 12, that is, a portion of the bendable section 13 in which the imaging section 15 or the circuit section 16 is arranged. In this case, for example, it is possible to suppress power interruption by the wiring or the like when electric power is supplied from the power source to the imaging section 15 in order for the imaging section 15 to capture an image.

As another example, the power source may be stored near the center of the bendable section 13 in the longitudinal axial direction (that is, at a position substantially equidistant from both end portions of the bendable section 13). In this case, since the power source is arranged at a position substantially equidistant from the reinforcing sections 12 and 14 including various types of circuits stored therein, weight balance is more preferable than when the power source is arranged near any one of the reinforcing sections 12 and 14. For this reason, in this case, it is possible to flexibly deal with various use purposes (installation methods) of the imaging device 1 including an application example to be described later. This similarly applies, for example, when the power source is arranged over substantially the entire bendable section 13 using a cable-like battery.

As the power source of the imaging device 1, a battery which is not easily deformed such as a button-like battery mentioned above may be applied. To this end, for example, a part having higher rigidity than other parts of the bendable section 13 may be arranged as a part of the bendable section 13 in which the power source is stored in order to prevent the power source from being deformed. As another example, a part in which the power source is arranged may be configured as a part of the reinforcing section 12 or 14.

An example of a detailed configuration of the bendable section 13 will be separately described later.

The reinforcing sections 12 and 14 are configured to have higher rigidity (that is, higher strength) than the bendable section 13, and have a shape which is maintained without being deformed even in a situation in which the bendable section 13 is bent by external pressure. Through this configuration, it is possible to prevent a situation in which various kinds of components (for example, the imaging section 15, the circuit section 16, the connection terminal 141, and the like) arranged in the reinforcing sections 12 and 14 are deformed by external pressure.

The imaging section 15 includes an imaging element 153 such as a complementary metal-oxide semiconductor (CMOS) image sensor or a charge coupled device (CCD) image sensor and an optical system 151 such as a lens and is configured to capture an image of a subject.

As illustrated in FIG. 1, in the imaging device 1 according to the present embodiment, the imaging element 153 and the optical system 151 are arranged side by side in the axial direction L0. In other words, the imaging element 153 and the optical system 151 are arranged so that an optical axis of the optical system 151 substantially coincides with the axial direction L0. In other words, the imaging section 15 is configured to image the subject located in a direction facing in the axial direction L0 from the end portion of the reinforcing section 12 in the axial direction L0 as indicated by reference numeral R1. The imaging element 153 and the optical system 151 of the reinforcing section may be arranged to be able to perform imaging in the axial direction L0 or in a predetermined direction based on the reinforcing section 12 and may be arranged in a different manner from the example of FIG. 1. For example, the reinforcing section may have a shape other than a substantially cylindrical shape, and a direction in which imaging is performed by the imaging element 153 and the optical system 151 may form an angle substantially perpendicular to the axial direction L0 or any other angle. As another example, the reinforcing section 12 may have a substantially rectangular parallelepiped shape with rounded corners, and the imaging element 153 and the optical system 151 may be arranged to be able to perform imaging in substantially a vertical direction with respect to both one surface of the substantially rectangular parallelepiped and the axial direction L0. In the following description, an area in which the imaging section 15 images the subject, that is, an area indicated by reference numeral R1, is also referred to as an "imaging range R1."

Further, through the configuration of the imaging element 153 and the optical system 151 described above, in the imaging section 15, a focal length or a magnification of a so-called optical zoom is adjusted by shifting lenses of the optical system 151 in the axial direction L0, As illustrated in FIG. 1, since the imaging device 1 according to the present embodiment is formed in an elongated shape, it is possible to secure a relatively long distance as a distance for shifting the lenses of the optical system 151 by arranging the lenses in the axial direction L0.

The circuit section 16 is configured to control operations of various kinds of components arranged in the imaging device 1. The circuit section 16 may be configured, for example, as a so-called microcomputer. For example, the circuit section 16 may be configured with a processor such as a central processing unit (CPU), a graphics processing unit (GPU), a digital signal processor (DSP), a system on chip (SoC), or the like.

The circuit section 16 may include a communication device that enables the imaging device 1 to perform transmission and reception of information via a wireless communication path with an external device. In this case, the circuit section 16 may include a communication antenna, a radio frequency (RF) circuit, a baseband processor, and the like.

Further, the circuit section 16 may include a storage section for storing various kinds of data (for example, image data imaged by the imaging section 15). For example, the storage section included in the circuit section 16 may be implemented by a storage medium such as a random access memory (RAM), a read only memory (ROM), a semiconductor memory, or the like.

Further, the circuit section 16 may include a sound collecting section that collects sounds produced by a user or sounds in a surrounding environment and acquiring the sounds as acoustic information (acoustic signals). For example, the sound collecting section may be configured with a sound collecting device such as a so-called microphone.

In the example illustrated in FIG. 1, the circuit section 16 is arranged in the reinforcing section 12, but when the circuit section 16 is arranged in a portion having higher rigidity than the bendable section 13, a position thereof is not necessarily limited to the reinforcing section 12. As a specific example, all or a part of the circuit section 16 may be arranged on the reinforcing section 14 side. This similarly applies to the connection terminal 141. In other words, the connection terminal 141 may be arranged on the reinforcing section 12 side or may be arranged in each of the reinforcing sections 12 and 14.

The example of the schematic configuration of the imaging device 1 according to the present embodiment has been described above with reference to FIG. 1. As described above, the imaging device 1 according to the present embodiment includes the bendable section 13 configured to be bendable and the imaging section 15 held at the end portion of the bendable section 13 in the axial direction L0. Further, the bendable section 13 is configured to be plastic-deformable. Accordingly, the user can use the bendable section 13 as a holding member for holding the imaging section 15 at a desired position or with a desired posture by bending the bendable section 13 in a desired shape.

Figure 2:
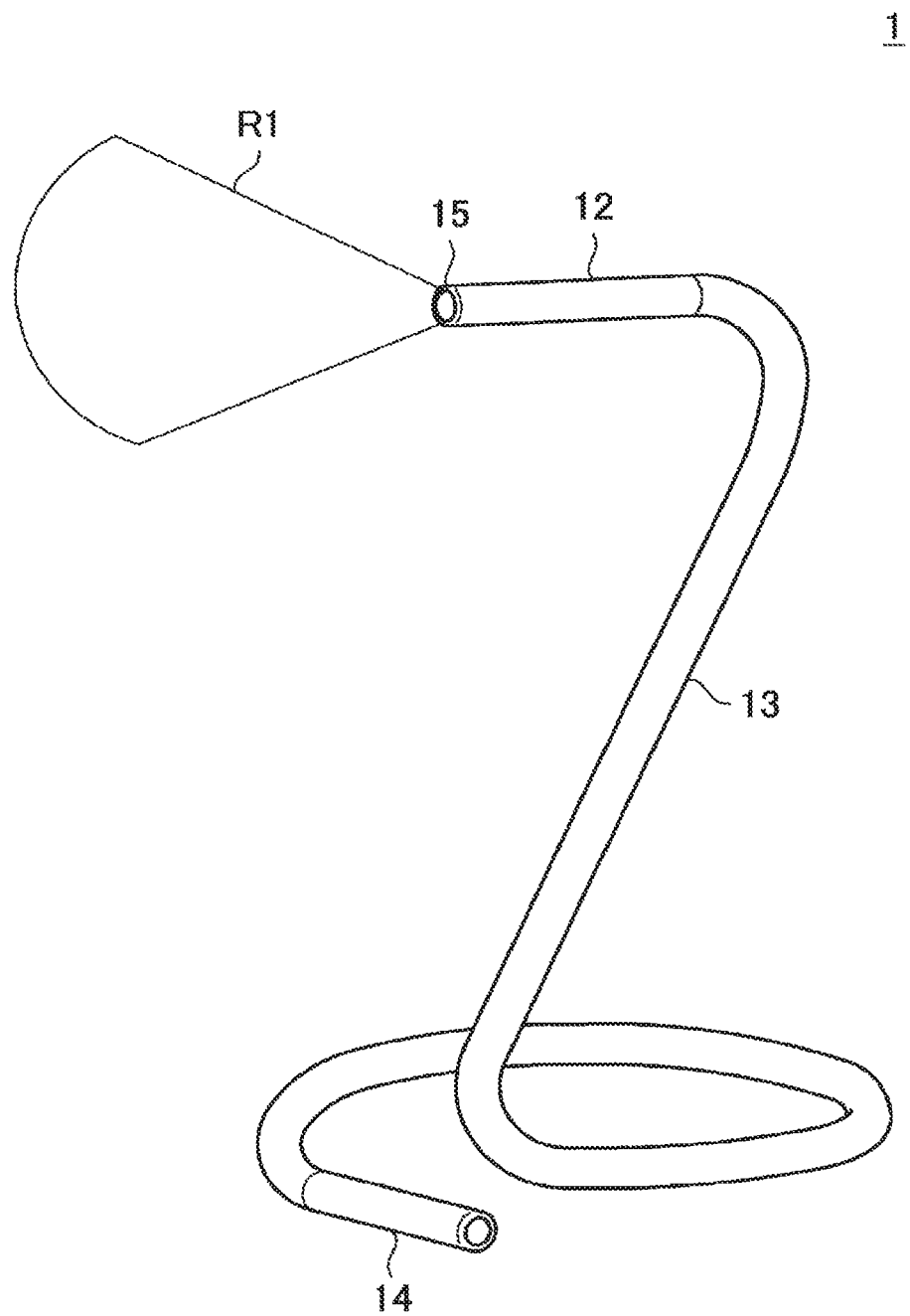
FIG. 2 is an explanatory diagram for describing an overview of the imaging device according to the embodiment.

For example, FIG. 2 is an explanatory diagram for describing an overview of the imaging device 1 according to the present embodiment and illustrates an example of a form of the imaging device 1. In the example illustrated in FIG. 2, one part of the bendable section 13 on the reinforcing section 14 side is bent, and the other part of the bendable section 13 on the reinforcing section 12 side is placed to stand on a horizontal plane using the bent one part of the bendable section 13 on the reinforcing section 14 side as a base. Accordingly, it is possible to install the imaging device 1 so that the imaging section 15 has a predetermined position relation with respect to the horizontal plane.

Figure 3:
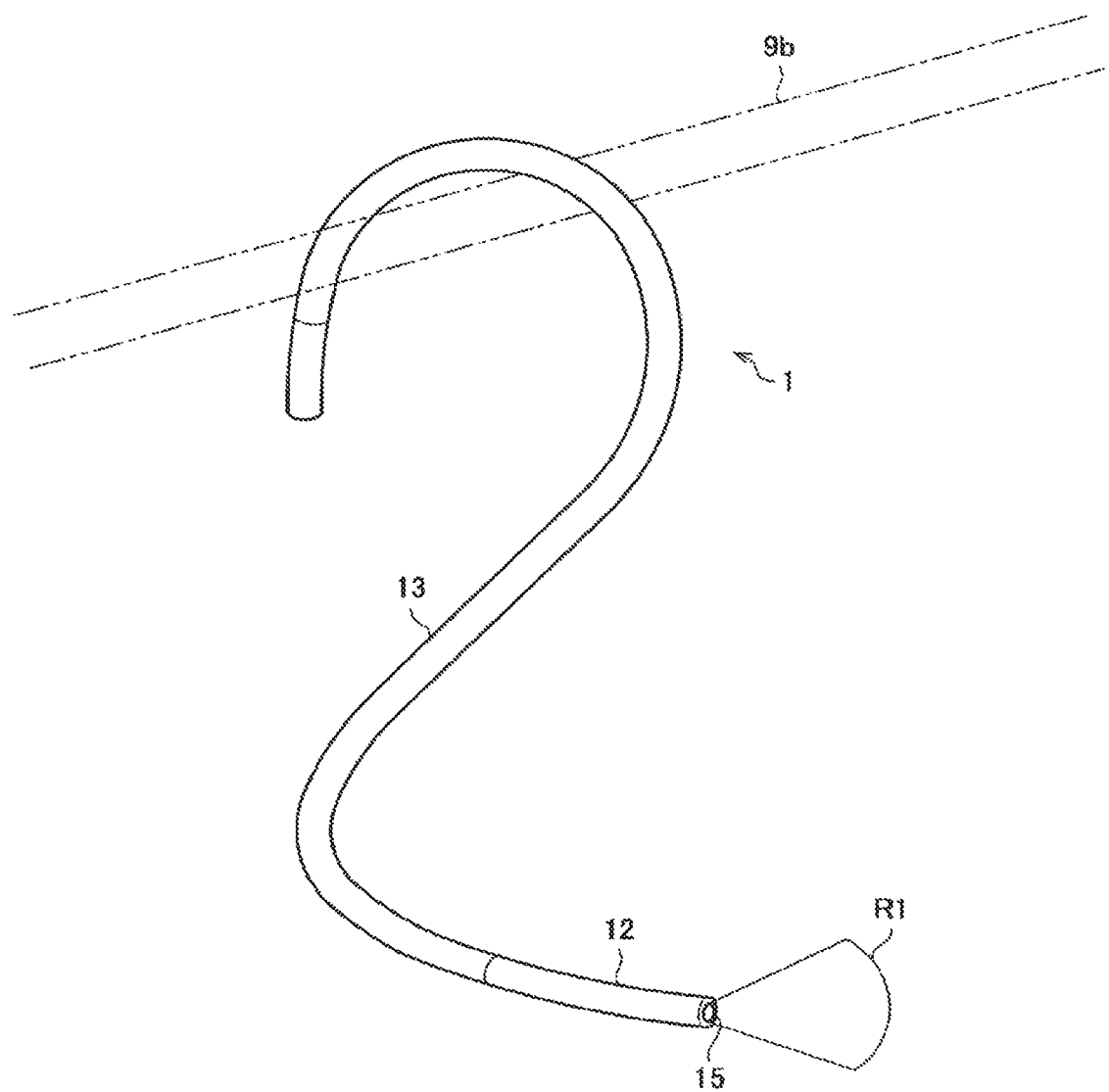
FIG. 3 is an explanatory diagram for describing an overview of the imaging device according to the embodiment.

FIG. 3 is an explanatory diagram for describing an overview of the imaging device 1 according to the present embodiment and illustrates another example of the form of the imaging device 1. In the example illustrated in FIG. 3, a part of the bendable section 13 on the reinforcing section 14 side is bent in a hook shape, and the part of the bendable section 13 on the reinforcing section 14 side which is bent in a hook shape is hooked on a bar-like object 9b, and thus the imaging device 1 is suspended on the object 9b. In other words, when the imaging device 1 as illustrated in FIG. 3 is used, as long as there is a place on which the part of the bendable section 13 which is bent in a hook shape can be hooked such as the bar-like object 9b, the imaging device 1 can be installed.

[1.2. Configuration of Bendable Section]

Next, an example of a detailed configuration of the bendable section 13 will be described, particularly focusing on an internal structure of the bendable section 13.

Figure 4:
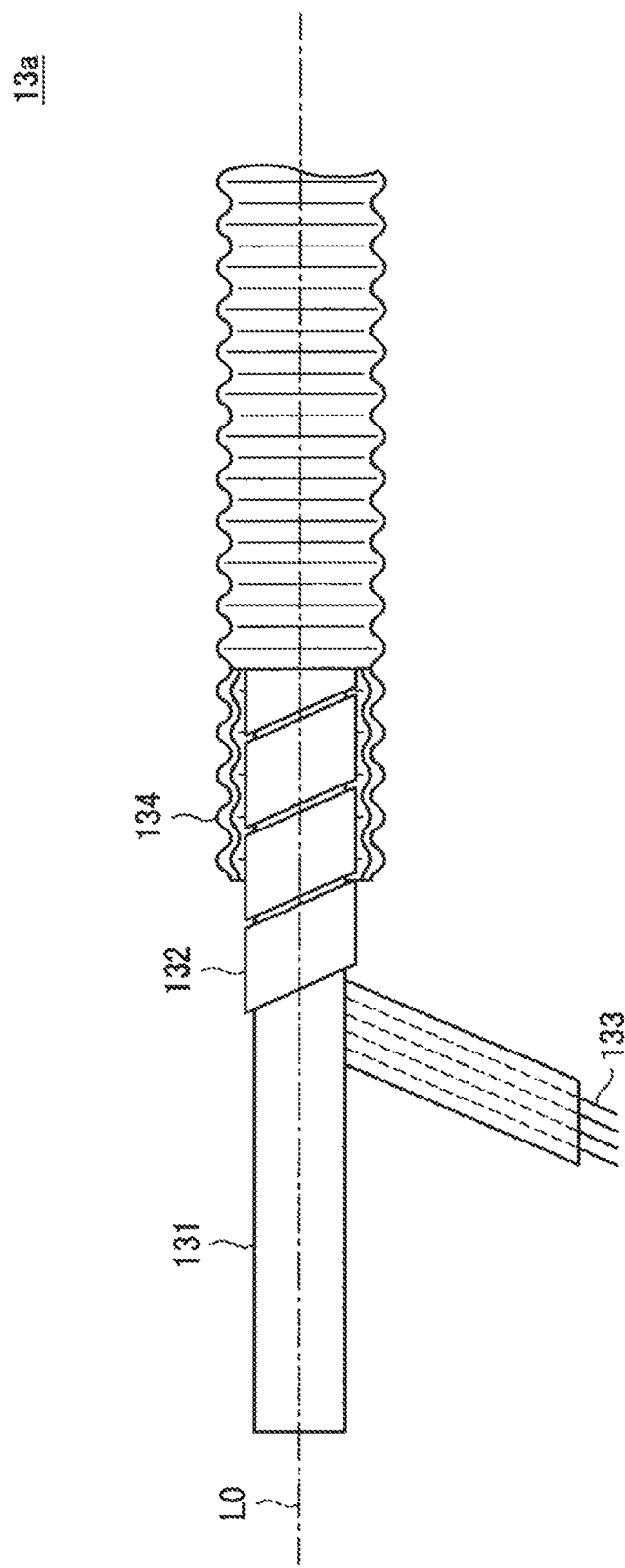
FIG. 4 is an explanatory diagram for describing an example of a configuration of a bendable section of the imaging device according to the embodiment.

For example, FIG. 4 is an explanatory diagram for describing an example of the configuration of the bendable section 13 of the imaging device 1 according to the present embodiment. FIG. 4 illustrates an example in which the bendable section 13 is implemented using a structure capable of extending in the longitudinal direction such as a so-called bellows-like (bellows-shaped) structure or a coil-like structure. In the following description, particularly, an example illustrated in FIG. 4 which is explicitly indicated among the bendable sections 13 is also referred to as a "bendable section 13a."

As illustrated in FIG. 4, the bendable section 13a includes a cable-like cable battery 131 arranged to extend in the axial direction L0, a plane wiring member 132, and a covering member 134.

As the cable battery 131, for example, a lithium ion battery formed in a cable shape can be used. A side surface of the cable battery 131 may be covered with a so-called insulating material.

The plane wiring member 132 is formed by covering a wiring 133 with a base film formed of an insulating material. At this time, when a plurality of wirings 133 are included, it is desirable that the plurality of wirings 133 be electrically isolated from one another by the base film. In other words, the plane wiring member 132 may be configured as, for example, a so-called flexible substrate.

As a specific example, the plane wiring member 132 may be formed by laminating upper and lower sides of a plurality of wirings 133 which are arranged in parallel with two adhesive films (for example, insulating tapes) with an adhesive. Further, as the base film of the insulating tape, for example, a resin film such as polyethylene terephthalate (PET) or polyimide (PI) may be used.

Further, the wirings 133 correspond to various kinds of wirings for transmitting and receiving information between various types of components (for example, the imaging section 15 and the circuit section 16) arranged in the reinforcing section 12 illustrated in FIG. 1 and various kinds of components (for example, the connection terminal 141) arranged in the reinforcing section 14.

The plane wiring member 132 is spirally wound around the cable battery 131 in the axial direction L0 and held so that a portion formed on a surface faces a side surface of the cable battery 131 and creeps along the side surface.

The covering member 134 has a cylindrical shape in which an opening is formed in the axial direction L0 and is formed in a bellows-like (bellows-shaped) shape in which the axial direction L0 is an expansion/contraction direction. Through this configuration, at least a part of the covering member 134 in the circumferential direction expands and contracts in the axial direction L0 due to external pressure, and thus the shape thereof is changed to be bent. Although not described in detail, it will be appreciated that the covering member 134 can have a characteristic in which the deformed (bent) shape of the covering member 134 is retained even after the external pressure is eliminated due to the structure of the covering member 134 or a material used as the covering member 134.

The cable battery 131 around which the plane wiring member 132 is wound to creep along the axial direction L0 is installed in the opening of the covering member 134. Further, for example, it is desirable that terminals (end portions) of the cable battery 131 and the wirings 133 formed in the plane wiring member 132 be exposed outside the bendable section 13a from the end portions of the covering member 134 in the axial direction L0 and connected to various kinds of components arranged in the reinforcing sections 12 and 14.

Through this configuration, the cable battery 131 can be installed in the bendable section 13a as the power source, and various types of components arranged in the reinforcing section 12 illustrated in FIG. 1 can be electrically connected with various kinds of components arranged in the reinforcing section 14 via the wirings 133.

Further, the bendable section 13a is deformed to be bent by external pressure due to the above-mentioned characteristic of the covering member 134, and the deformed shape is retained even after the external pressure is eliminated. In other words, through the configuration described above, the bendable section 13a illustrated in FIG. 4 has a characteristic in which it is bendable and plastic-deformable.

As the example of the configuration of the bendable section 13 of the imaging device 1 according to the present embodiment, the example of using the structure enabling extension in the longitudinal direction such as the so-called bellows-like (bellows-shaped) structure or the coil-like structure has been described above with reference to FIG. 4.

Figure 5:
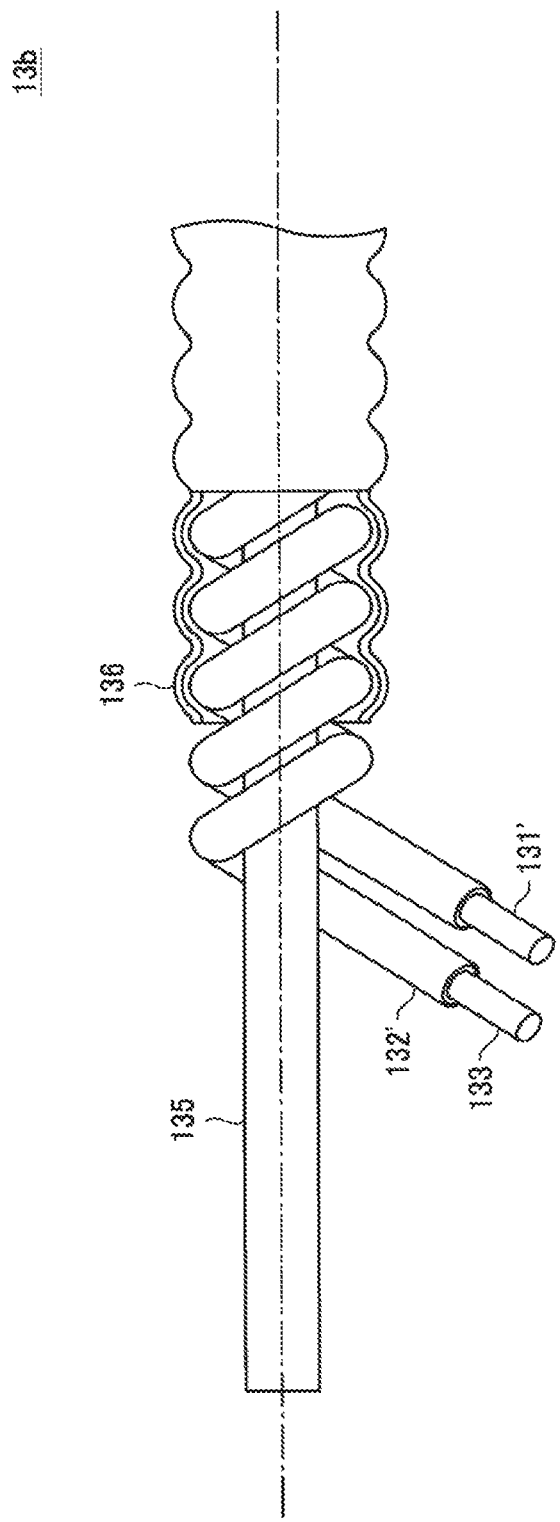
FIG. 5 is an explanatory diagram for describing another example of the configuration of the bendable section of the imaging device according to the embodiment.

Next, another example of the configuration of the bendable section 13 of the imaging device 1 according to the present embodiment will be described with reference to FIG. 5. FIG. 5 is an explanatory view for describing another example of the configuration of the bendable section 13 of the imaging device 1 according to the present embodiment and illustrates an example in which the bendable section 13 is implemented using a plastic-deformable shape-retaining material. Hereinafter, particularly, an example illustrated in FIG. 5 which is explicitly indicated among the bendable sections 13 is also referred to as a "bendable section 13b."

As illustrated in FIG. 5, the bendable section 13b includes a cable-like core member 135 that is arranged to extend in the axial direction L0, a cable battery 131', a wiring member 132', and a covering member 136.

The core member 135 is formed of a plastic-deformable shape retaining material. As a specific example, the core member 135 may be formed by installing a wiring which is a plastic-deformable shape retaining material to extend in the axial direction L0 and covering a side surface of the wiring with a stretchable material such as a silicone resin. Further, as another example, the core member 135 may be formed of a resin material such as a plastic-deformable polyethylene material formed in a fibrous form.

The cable battery 131' corresponds to the cable battery 131 in the bendable section 13a described above with reference to FIG. 4.

Further, the wiring member 132' corresponds to the plane wiring member 132 in the bendable section 13a described above with reference to FIG. 4 and may be formed by covering the wiring 133 with a covering material formed of an insulating material. As the covering material for covering the wiring 133 in the wiring member 132', for example, a resin material such as polyethylene terephthalate (PET), polyimide (PI) polyvinyl chloride (PVC), polyethylene (PE), or Teflon (FEP) (a registered trademark) may be used.

As illustrated in FIG. 5, the cable battery 131' and the wiring member 132' are spirally wound around the core member 135 in the axial direction L0 and held.

The covering member 136 protects the cable battery 131', the wiring member 132', and the core member 135 by covering the entire side surface of the core member around which the cable battery 131' and the wiring member 132' are wound. For example, the covering member 136 may be formed of a stretchable material such as silicone resin. Further, for example, the covering member 136 may be formed of a resin material such as polyethylene terephthalate (PET), polyimide (PI) polyvinyl chloride (PVC), polyethylene (PE), or Teflon (FEP).

For example, it is desirable that the terminals (end portions) of the cable battery 131' and the wirings 133 arranged in the wiring member 132' be exposed outside the bendable section 13b from the end portion of the bendable section 13b in the axial direction L0 and connected with various kinds of components arranged in the reinforcing sections 12 and 14.

Through this configuration, the cable battery 131' can be installed in the bendable section 13b as the power source, and various types of components arranged in the reinforcing section 12 illustrated in FIG. 1 can be electrically connected with various kinds of components arranged in the reinforcing section 14 via the wirings 133.

The bendable section 13b is deformed to be bent by the external pressure due to the characteristic of the core member 135 formed of a plastic-deformable shape retaining material, and the deformed shape is retained even after the external pressure is eliminated. In other words, through the configuration described above, the bendable section 13b illustrated in FIG. 5 has a characteristic in which it is bendable and plastic-deformable.

As the example of the configuration of the bendable section 13 of the imaging device 1 according to the present embodiment, the example in which the bendable section 13 is implemented using the plastic-deformaable shape retaining material has been described above with reference to FIG. 5.

The configurations of the bendable section 13 described above with reference to FIGS. 4 and 5 are merely examples and not necessarily limited to the same configurations. In other words, the structure of the bendable section 13 is not particularly limited as long as the bendable section 13 can include a power source therein and have bendable and plastic-deformable characteristics, and further various types of components arranged in the reinforcing section 12 can be electrically connected with various types of components arranged in the reinforcing section 14.

As a specific example, for example, in the case of the example illustrated in FIG. 5, the bendable section 13 may be formed by tying the core member 135, the cable battery 131', and the wiring member 132' and covering them with the covering member 136.

[1.3 Configuration for Bending by Drive Section]

In the example described above with reference to FIGS. 1 to 5, the example of the configuration of bending the bendable section 13 by applying the external pressure to the bendable section 13 has been described. On the other hand, a drive section for bending the bendable section 13 may be arranged in at least a part of the bendable section 13, and an operation of the drive section may be controlled by the imaging device 1 itself (for example, a control unit arranged in the circuit section 16) such that the imaging device 1 may automatically bend the bendable section 13.

Figure 6:
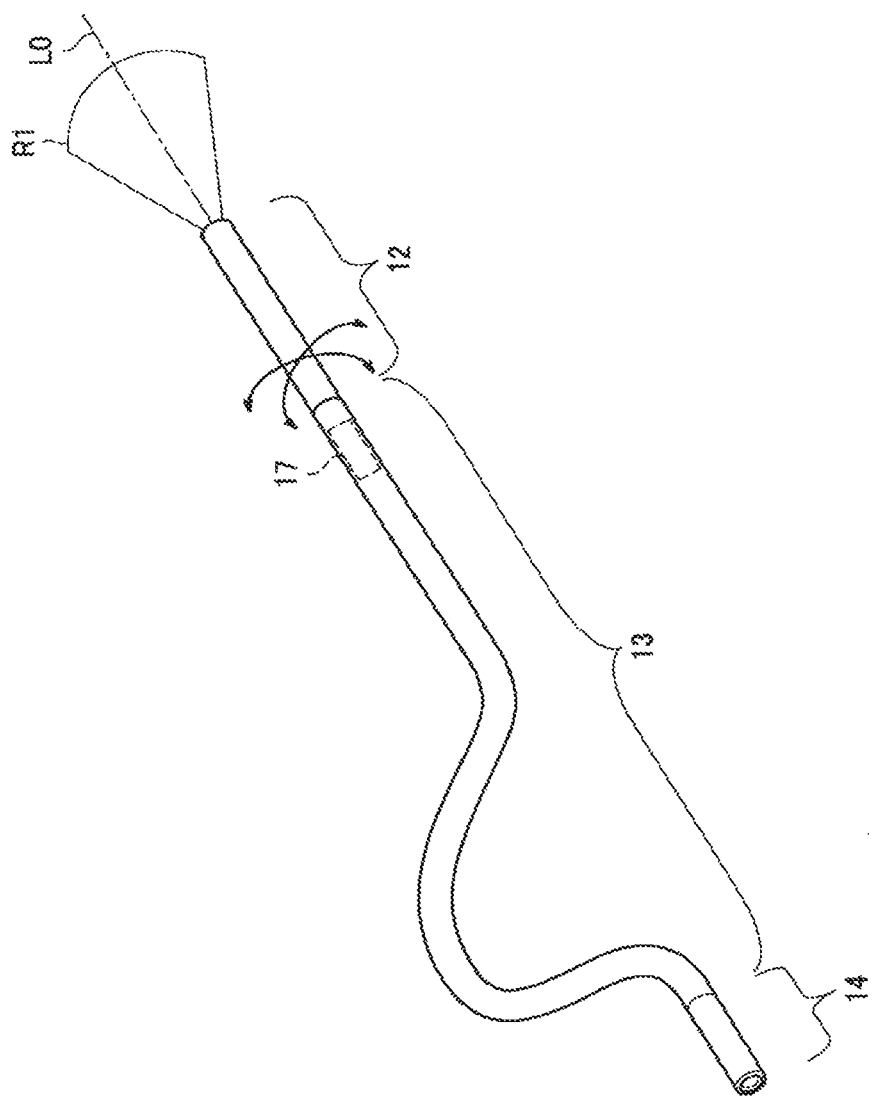
FIG. 6 is a diagram illustrating an example of a schematic configuration of an imaging device in which a drive section is arranged in at least a part of a bendable section.

For example, FIG. 6 is a diagram illustrating an example of a schematic configuration of an imaging device 1 in which the drive section is arranged in at least a part of the bendable section 13. In the imaging device 1 illustrated in FIG. 6, a drive section 17 for bending the bendable section 13 is arranged in a part of the bendable section 13 near the reinforcing section 12.

In the example illustrated in FIG. 6, for example, the circuit section 16 arranged in the reinforcing section 12 controls a direction of the imaging section 15 by driving the drive section 17 to bend the bendable section 13 on the basis of supply of electric power from the power source arranged in the bendable section 13.

Figure 7:
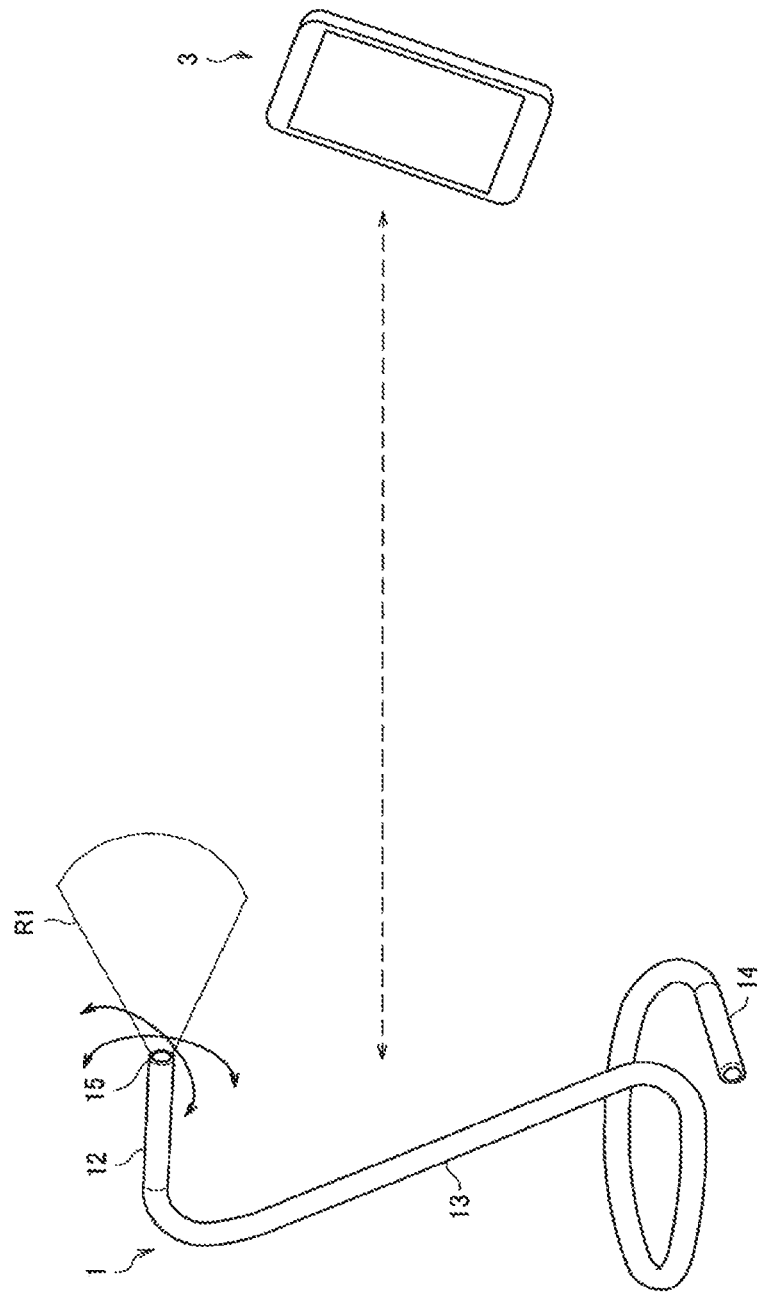
FIG. 7 is an explanatory diagram for describing an application example of the imaging device according to the embodiment.

At this time, the circuit section 16 may operate on the basis of an instruction from an external device different from the imaging device 1. For example, FIG. 7 is an explanatory diagram for describing an application example of the imaging device 1 and illustrates an example in which the imaging device 1 operates on the basis of an instruction from an information processing terminal 3 such as smartphone. In other words, in the example illustrated in FIG. 7, the circuit section 16 of the imaging device 1 establishes a communication path with the information processing terminal 3, and controls the direction of the imaging section 15 by driving the drive section 17 to bend the bendable section 13 on the basis of an instruction from the information processing terminal 3 via the communication path.

In the example illustrated in FIG. 7, for example, a predetermined application may be installed in the information processing terminal 3, and the information processing terminal 3 may extend various kinds of functions for controlling the operation of the imaging device 1 through the application.

An example of the function implemented (expanded) by the application includes, for example, a live view function. Specifically, the imaging device 1 may transmit a so-called live view image captured by the imaging section 15 to the information processing terminal 3 via the communication path on the basis of an instruction from an application installed in the information processing terminal 3. As the live view image, an image (for example, a thinned-out image) having a lower resolution than an image which is captured by the imaging section 15 and recorded on a recording medium arranged in the circuit section 16 may be used. Accordingly, for example, the user can check an image of a subject within an angle of view of the imaging section 15 through the information processing terminal 3 in order to adjust the angle of view of the imaging section 15 of the imaging device 1.

As another example, a so-called remote control function of causing the imaging section 15 to capture an image on the basis of an instruction from the information processing terminal 3 may be used. Specifically, the imaging device 1 may cause the imaging section 15 to capture an image on the basis of an instruction from an application installed in the information processing terminal 3. At this time, the imaging device 1 may record the image captured by the imaging section 15 on, for example, a recording medium arranged in the circuit section 16. Further, the imaging device 1 may transmit the image captured by the imaging section 15 to the information processing terminal 3 via the communication path. Further, the imaging device 1 may perform switching between whether the image captured by the imaging section 15 is recorded on a recording medium and whether the image is transmitted to the information processing terminal 3 via the communication path on the basis of an instruction from an application installed in the information processing terminal 3.

A type of communication path established between the imaging device 1 and the information processing terminal 3 is not particularly limited as long as information can be transmitted and received between the imaging device 1 and the information processing terminal 3. As a specific example, the imaging device 1 and the information processing terminal 3 may perform transmission and reception of information via a wireless communication path. As another example, the imaging device 1 and the information processing terminal 3 may perform transmission and reception of information via a wired communication path. Further, when the wired communication path is established, for example, a connection terminal for connecting a communication cable may be connected to the connection terminal 141 of the imaging device 1 as the external unit 2.

For example, the circuit section 16 may autonomously control the direction of the imaging section 15 by driving the drive section 17 to bend the bendable section 13 on the basis of the image captured by the imaging section 15 or a detection result of a detecting section such as various kinds of sensors. Examples of the detecting section include an acceleration sensor, a gyro sensor, and a geomagnetic sensor. Further, a configuration for detecting position information such as a Global Positioning System (GPS) may be arranged as the detecting section. A configuration and control content when the circuit section 16 autonomously controls the direction of the imaging section 15 will be described later in detail as a modified example.

An example of a configuration of the drive section 17 for bending the bendable section 13 will be described with reference to FIGS. 8 to 10.

Figure 8:
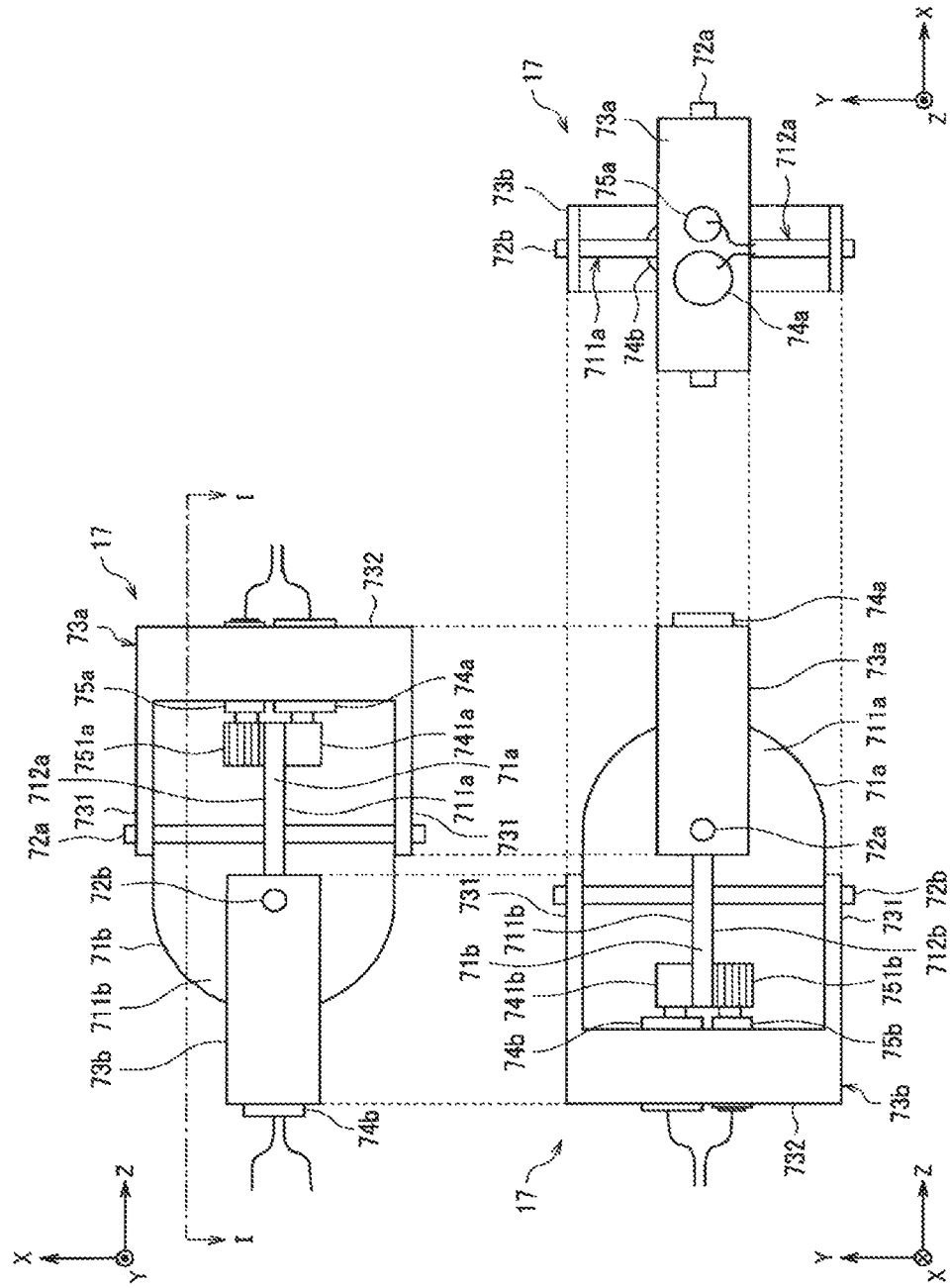
FIG. 8 is an orthographic view illustrating an example of a configuration of a drive section.

For example, FIG. 8 is a three-orthographic view illustrating an example of a configuration of the drive section 17. In FIG. 8, a z direction corresponds to the axial direction L0 illustrated in FIG. 6, an x direction and a y direction are directions which are orthogonal to each other and vertical to the axial direction L0. In the following description, for the sake of convenience, in a front view and a plane view of the drive section 17 illustrated in FIG. 8, a right direction is also referred to as a "+z direction," and a left direction is also referred to as a "−z direction." Similarly, in the front view and a side view of the drive section 17 illustrated in FIG. 8, an upward direction is also referred to as a "+y direction," and a downward direction is also referred to as a "−y direction." Further, in the plane view of the drive section 17 illustrated in FIG. 8, an upward direction is also referred to as a "+x direction," and a downward direction is also referred to as a "−x direction."

As illustrated in FIG. 8, the drive section 17 includes planar members 71a and 71b, shaft members 72a and 72b, holding members 73a and 73b, drive members 741a and 741b, and motors 74a and 74b. Further, the drive section 17 may include at least either a gear 751a and an encoder 75a or a gear 751b and an encoder 75b.

In the following description, a drive system including the planar member 71a, the shaft member 72a, the holding member 73a, the drive member 741a, and the motor 74a is also referred to as a "first drive system 17a." Similarly, the drive system including the planar member 71b, the shaft member 72b, the holding member 73b, the drive member 741b, and the motor 74b is also referred to as a "second drive system 17b." Further, when the gear 751a and the encoder 75a are arranged, the gear 751a and the encoder 75a are assumed to be included in the first drive system 17a. Similarly, when the gear 751b and the encoder 75b are arranged, the gear 751b and the encoder 75b are assumed to be included in the second drive system 17b.

As illustrated in FIG. 8, each of the shaft members 72a and 72b is configured with a linear member, and both of the shaft members 72a and 72b are orthogonal to each other in the z direction (that is, the axial direction L0) and held to extend in different directions.

The planar member 71a is configured with a planar member and held by the shaft member 72a to be vertical to the shaft member 72a. At this time, the planar member 71a is fixed to the shaft member 72a. Similarly, the planar member 71b is configured with a planar member and held by the shaft member 72b to be vertical to the shaft member 72b. At this time, the planar member 71b is fixed to the shaft member 72b.

Further, the planar member 71a includes an end portion which is formed on one side in the z direction along one circumferential direction in which the shaft member 72a serves as an axis. For example, in the example illustrated in FIG. 8, the end portion of the planar member 71a on the +z direction side is formed in a semicircular shape along the circumferential direction in which the shaft member 72a serves as an axis. Similarly, the planar member 71b includes an end portion which is formed on the other side in the z direction along a circumferential direction in which the shaft member 72b serves as an axis. For example, in the example illustrated in FIG. 8, the end portion of the planar member 71b on the −z direction side is formed in a semicircular shape along the circumferential direction in which the shaft member 72b serves as an axis.

Further, an end portion side of the planar member 71a in the −z direction is fixed to an end portion side of the planar member 71b in the +z direction. Through this configuration, in the example illustrated in FIG. 8, relative position relations between the planar members 71a and 71b and the shaft members 72a and 72b are fixed. Further, the planar members 71a and 71b and the shaft members 72a and 72b may be integrally formed.

The holding member 73a is held to the shaft member 72a to be rotatable in the circumferential direction in which the shaft member 72a serves as an axis. Specifically, the holding member 73a includes two rotating members 731 and an erection member 732. Each of the rotating members 731 is a plate-like member which is held to be rotatable in the circumferential direction in which the shaft member 72a serves as an axis and formed to extend in a radial direction with respect to the axis. The two rotating members 731 are held by different end portions of the end portions of both of the shaft members 72a. Further, the erection member 732 is a plate-like member which is formed to bridge the end portions of the rotating members 731 on the opposite side from the end portions held by the shaft member 72a. In other words, the rotating members 731 are bridged by the erection member 732, and thus the rotating members 731 rotate integrally when rotating in the circumferential direction in which the shaft member 72a serves as an axis.

The holding member 73b is held to the shaft member 72b to be rotatable in the circumferential direction in which the shaft member 72b serves as an axis. The holding member 73b has a similar configuration to that of the holding member 73a, and thus detailed description thereof is omitted.

The motor 74a is held by the holding member 73a so that the rotary shaft is exposed in the −z direction with respect to the erection member 732 of the holding member 73a. The drive member 741a having a substantially cylindrical shape is held to the rotary shaft of the motor 74a. At this time, at least a part of the side surface of the drive member 741a comes into contact with one surface 711a of the planar member 71a to face the surface 711a.

Further, on the end portion side of the motor 74a opposite to the rotary shaft, various kinds of wirings such as a power supply line for supplying electric power to the motor 74a and a control line for controlling the operation of the motor 74a are exposed. In other words, it is possible to drive the motor 74a by connecting the power supply line to the power source and supplying a control signal to the control line.

Here, when the motor 74a is driven, the drive member 741a rotates, and the drive member 741a drives the planar member 71a to rotate in the circumferential direction in which the shaft member 72a serves as an axis by friction force generated between the side surface of the drive member 741a and one surface 711a of the planar member 71a. Accordingly, the holding member 73a rotates (moves rotationally) relative to the planar member 71a in a direction opposite to the circumferential direction.

Figure 9:
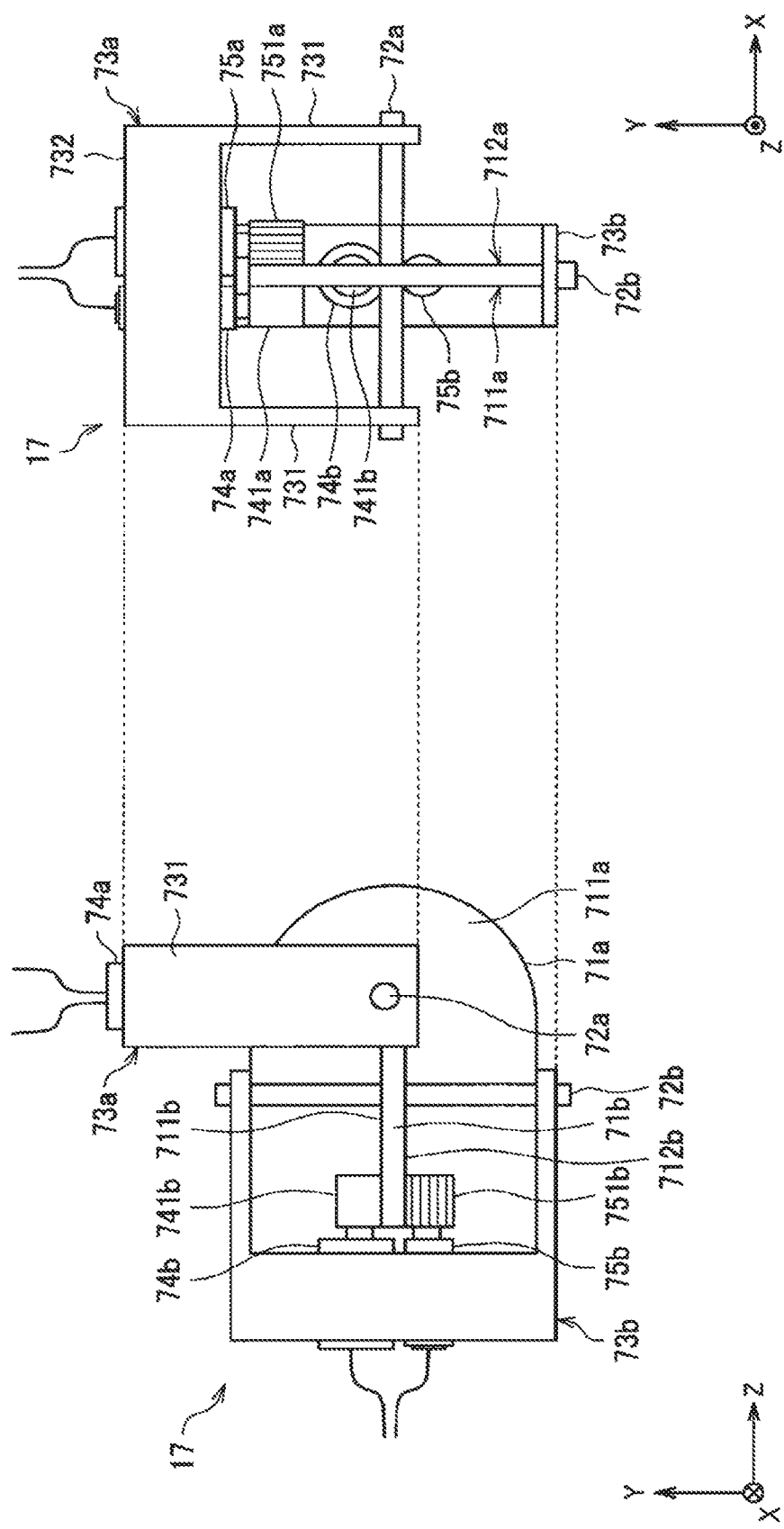
FIG. 9 is an explanatory diagram for describing a configuration of a drive section.

For example, FIG. 9 is an explanatory diagram for describing the configuration of the drive section 17 and illustrates an example of a schematic front view and a schematic side view of the drive section 17 in the case of driving the motor 74a. In the example illustrated in FIG. 9, the shaft member 72a is held to extend in the x direction. Therefore, when the motor 74a is driven, the holding member 73a rotates with respect to the planar member 71a in the circumferential direction in which the shaft member 72a serves as an axis (that is, the direction opposite to the direction in which the drive member 741a rotates the planar member 71a). In the example illustrated in FIG. 9, the holding member 73a rotates with respect to the planar member 71a in the +y direction in which the shaft member 72a serves as an axis, so that the drive section 17 is bent in a letter "L" shape.

By using this mechanism, for example, the drive section 17 can bend the bendable section 13 in the circumferential direction in which the x direction vertical to the axial direction L0 (that is, the z direction) serves as an axis.

Particularly, in the configuration in which, for example, the motor 74a is actively driven, there are cases in which an internal component (for example, a gear or the like) is damaged by a load acting as an external force. On the other hand, in the example illustrated in FIG. 9, the drive section 17 is configured so that the drive member 741a frictionally drives the planar member 71a as described above. Through this configuration, even when an unexpected excessive load is externally applied to the drive section 17, for example, when the bendable section 13 is bent, the motor 74a can be prevented from being damaged by the load.

Similarly, the motor 74b is held by the holding member 73b so that the rotary shaft is exposed in the +z direction with respect to the erection member 732 of the holding member 73b. A drive member 741b having a substantially cylindrical shape is held to the rotary shaft of the motor 74b. At this time, at least a part of the side surface of the drive member 741b comes into contact with one surface 711b of the planar member 71b to face the surface 711b.

Further, on the end portion side of the motor 74b opposite to the rotary shaft, various kinds of wirings such as a power supply line for supplying electric power to the motor 74b and a control line for controlling the operation of the motor 74b are exposed. In other words, it is possible to drive the motor 74b by connecting the power supply line to the power source and supplying a control signal to the control line.

Through this configuration, when the motor 74b is driven, the drive member 741b rotates, and the drive member 741b drives the planar member 71b in the circumferential direction in which the shaft member 72b serves as an axis by friction force generated between the side surface of the drive member 741b and one surface 711b of the planar member 71b. Accordingly, the holding member 73b rotates (moves rotationally) relative to the planar member 71b in a direction opposite to the circumferential direction.

In the examples illustrated in FIGS. 8 and 9, the shaft member 72b is held to extend in the y direction. Therefore, when the motor 74b is driven, the holding member 73b rotates with respect to the planar member 71b in the circumferential direction in which the shaft member 72b serves as an axis (that is, the direction opposite to the direction in which the drive member 741b rotates the planar member 71b). In other words, in the example illustrated in FIGS. 8 and 9, the holding member 73b rotates with respect to the planar member 71b in the x direction in which the shaft member 72b serves as an axis, so that the drive section 17 is bent in a letter "L" shape.

Next, an example of a configuration in which the drive section 17 includes the gear 751a and the encoder 75a and the gear 751b and the encoder 75b will be described with reference to FIGS. 8 to 10.

The encoder 75a is a component for measuring a rotation amount of the holding member 73a with respect to the planar member 71a in which the shaft member 72a serves as an axis. The encoder 75b is a component for measuring a rotation amount of the holding member 73b with respect to the planar member 71b in which the shaft member 72b serves as an axis.

Figure 10:
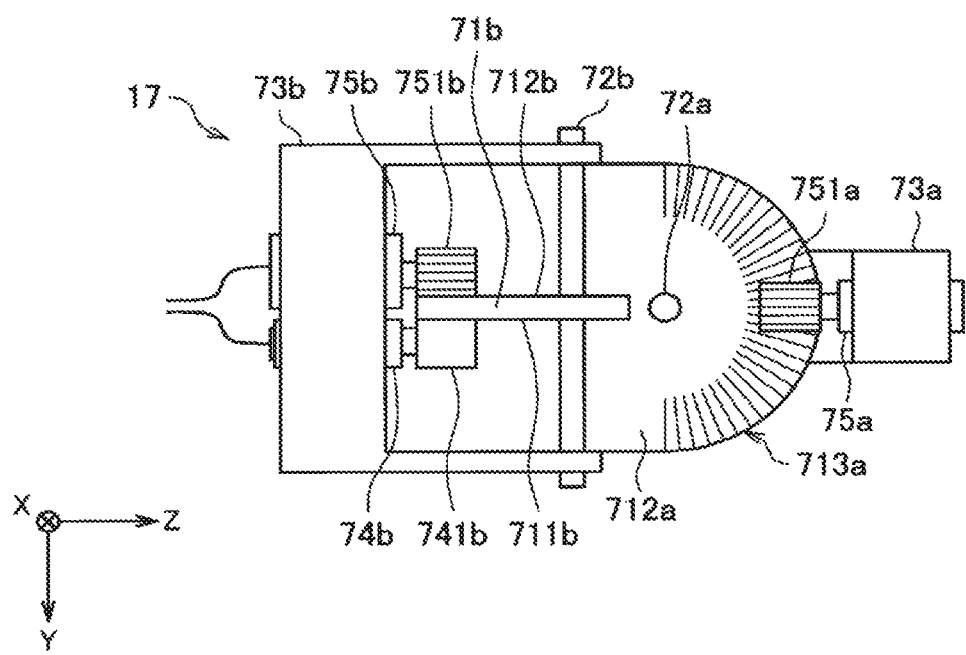
FIG. 10 is an example of a schematic cross-sectional view of the drive section illustrated in FIG. 8 along line I-I'.

Here, FIG. 10 is referred to. FIG. 10 is an example of a schematic cross-sectional view when the drive section 17 illustrated in FIG. 8 is taken along line I-I'.

As illustrated in FIG. 10, the encoder 75a is held by the holding member 73a so that the rotary shaft is exposed in the −z direction with respect to the erection member 732 of the holding member 73a. The gear 751a having a substantially cylindrical shape is held to the rotary shaft of the encoder 75a. Further, on the side surface of the gear 751a, teeth are formed along a direction in which the rotary shaft of the encoder 75a rotates. Further, on a surface 712a of the planar member 71a on the side opposite to the surface 711a, gear teeth are formed along the circumferential direction in which the shaft member 72a serves as an axis. In other words, the surface 712a side of the planar member 71a is configured as a gear having teeth formed along a circumferential direction on a plane such as, for example, a so-called bevel gear or a crown gear.

The gear 751a is held such that a part of the tooth formed on the side surface is engaged with the tooth formed on the surface 712a of the planar member 71a. Therefore, when the holding member 73a rotates in the circumferential direction in which the shaft member 72a serves as an axis, the holding member 73a rotates in the circumferential direction with respect to the planar member 71a. Accordingly, the gear 751a moves on the planar member 71a in the circumferential direction in which the shaft member 72a serves as an axis, and the rotary shaft of the encoder 75a rotates with the rotation of the gear 751a according to the movement. Through this configuration, the encoder 75a can measure the rotation amount of the rotary shaft and thus measure the rotation amount of the holding member 73a with respect to the planar member 71a in which the shaft member 72a serves as an axis on the basis of the rotation amount.

Further, on the end portion side of the encoder 75a on the side opposite to the rotary shaft, a wiring for outputting a signal indicating a result of measuring the rotation amount through the encoder 75a to the outside is exposed. In other words, the wiring is connected to, for example, the circuit section 16, and thus the circuit section 16 can acquire the result of measuring the rotation amount from the encoder 75a.

Unlike the motor 74a, the encoder 75a has no structure that the encoder 75a is actively driven. Therefore, although the gear 751a is gear-driven by the gear on the planar member 71a, a possibility of the encoder 75a being damaged by the external load is extremely lower than that of the motor 74a. Further, the gear 751a is gear-driven by the gear on the planar member 71a, and thus it is possible to measure the rotation amount more accurately through the encoder 75a.

Similarly, the encoder 75b is held by the holding member 73b so that the rotary shaft is exposed in the +z direction with respect to the erection member 732 of the holding member 73b. The gear 751b having a substantially cylindrical shape is held to the rotary shaft of the encoder 75b. Further, on the side surface of the gear 751b, teeth are formed along the direction in which the rotary shaft of the encoder 75b rotates. Further, on a surface 712b of the planar member 71b on the side opposite to the surface 711b, gear teeth are formed along the circumferential direction in which the shaft member 72b serves as an axis.

Further, the gear 751b is held such that a part of the tooth formed on the side surface is engaged with the tooth formed on the surface 712b of the planar member 71b. Therefore, when the holding member 73b rotates in the circumferential direction in which the shaft member 72b serves as an axis, the holding member 73b rotates in the circumferential direction with respect to the planar member 71b. Accordingly, the gear 751b moves on the planar member 71b in the circumferential direction in which the shaft member 72b serves as an axis, and the rotary shaft of the encoder 75b rotates with the rotation of the gear 751b according to the movement. Through this configuration, the encoder 75b can measure the rotation amount of the rotary shaft and thus measure the rotation amount of the holding member 73b with respect to the planar member 71b in which the shaft member 72a serves as an axis on the basis of the rotation amount.

Further, on the end portion side of the encoder 75b on the side opposite to the rotary shaft, a wiring for outputting a signal indicating a result of measuring the rotation amount through the encoder 75b to the outside is exposed. In other words, the wiring is connected to, for example, the circuit section 16, and thus the circuit section 16 can acquire the result of measuring the rotation amount from the encoder 75b.

Further, materials for forming the respective components of the drive section 17 are not particularly limited as long as the operation of the drive section 17 as described above can be implemented. Specifically, it is desirable that the planar members 71a and 71b, the shaft members 72a and 72b, the holding members 73a and 73b, the drive members 741a and 741b, and the gears 751a and 751b have rigidity that does not allow deformation when each component is driven. Further, the drive member 741a frictionally drives the planar member 71a. Therefore, it is desirable that the drive member 741a and the planar member 71a be formed of a material capable of obtaining friction force sufficient to frictionally drive the planar member 71a between the drive member 741a and the planar member 71a at the time of driving. This similarly applies to the drive member 741b and the planar member 71b.

In the above description, the example in which the drive member 741a frictionally drives the planar member 71a in the circumferential direction in which the shaft member 72a serves as an axis has been described, but the configurations of the drive member 741a and the planar member 71a are not necessarily limited to the same configurations. As a specific example, the drive member 741a may configured as a gear similarly to the gear 751a, and the teeth formed on the surface 711a of the planar member 71a along the circumferential direction in which the shaft member 72a serves as an axis may be engaged with the teeth of the drive member 741a to gear-drive the planar member 71a. This similarly applies to the drive member 741b and the planar member 71b. Further, a material of the drive member 741a or 741b may be a material having magnetism, and at the same time, a material of the planar member 71a or 71b may be a magnetic body. Through this configuration, the friction force between the drive member 741a or 741b and the planar member 71a or 71b may be obtained by magnetic force. Alternatively, the material of the drive member 741a or 741b may be a material having magnetism, and at the same time, the material of the drive member 751a or 751b may be a magnetic body or a material having magnetism by itself. Through this configuration, the frictional force between the drive member 741a or 741b (or the drive member 751a or 751b) and the planar member 71a or 71b may be obtained by attractive magnetic force between the drive member 741a or 741b and the drive member 751a or 751b.

Similarly, the drive member 741a may be arranged in the rotary shaft of the encoder 75a in place of the gear 751a, and the drive member 741 may be frictionally driven by the rotation of the planar member 71a. This similarly applies to the encoder 75b side.

The example of the configuration of the drive section 17 for bending the bendable section 13 has been described above with reference to FIGS. 8 to 10.

Next, another example of the configuration of the drive section 17 for bending the bendable section 13 will be described with reference to FIGS. 11 to 13.

Figure 11:
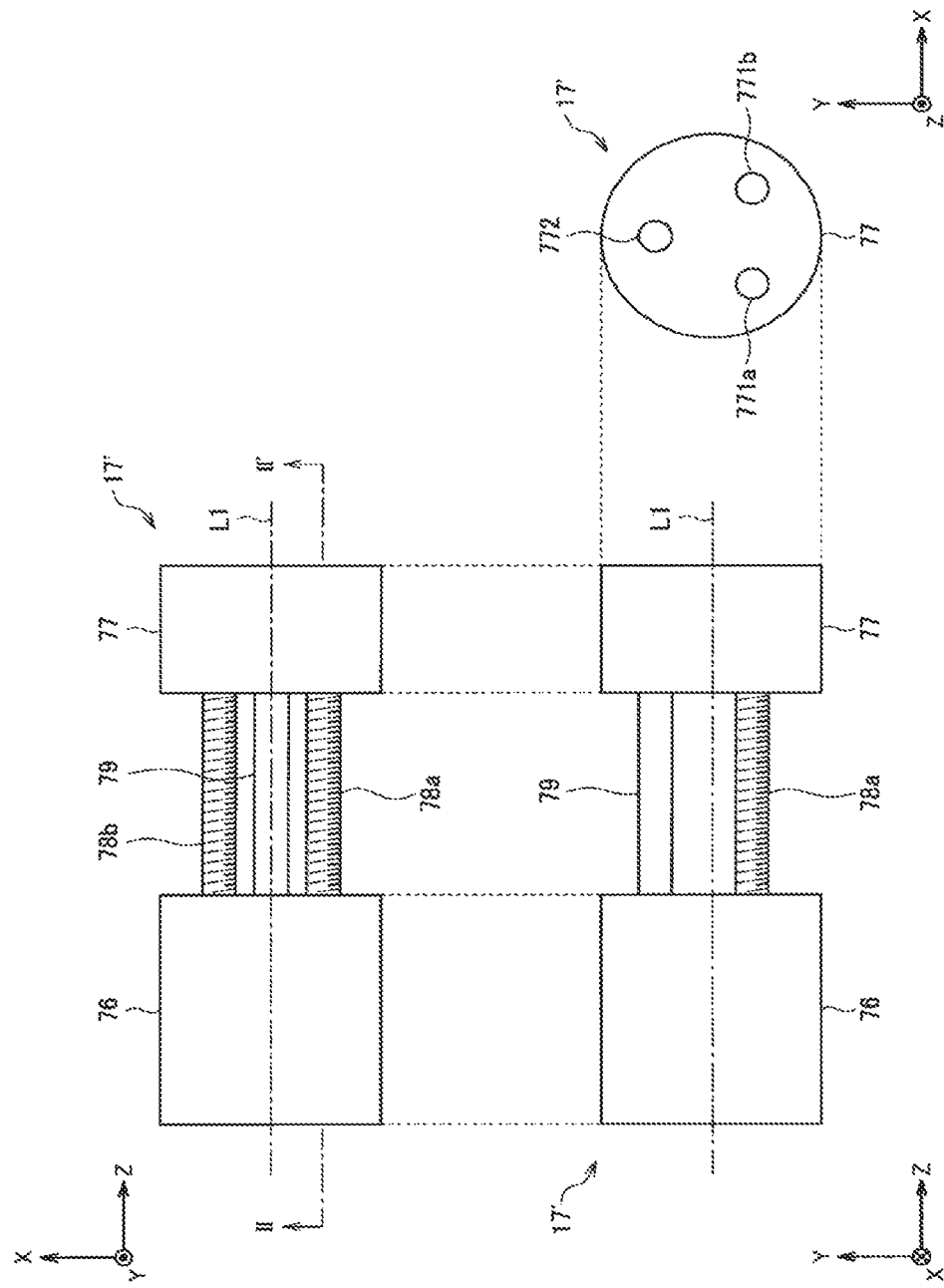
FIG. 11 is an orthographic view illustrating another example of the configuration of the drive section.

For example, FIG. 11 is a three-orthographic view illustrating another example of the configuration of the drive section 17. In the following description, the drive section 17 illustrated in FIG. 11 is also referred to as a "drive section 17'" when distinguished from the drive section 17 described above with reference to FIGS. 8 to 10. Further, FIG. 12 is an example of a schematic cross-sectional view when the drive section 17' illustrated in FIG. 11 is taken along line II-II'. FIG. 13 is an example of a schematic cross-sectional view when the drive section 17' illustrated in FIG. 12 is taken along line III-III'.

Figure 12:
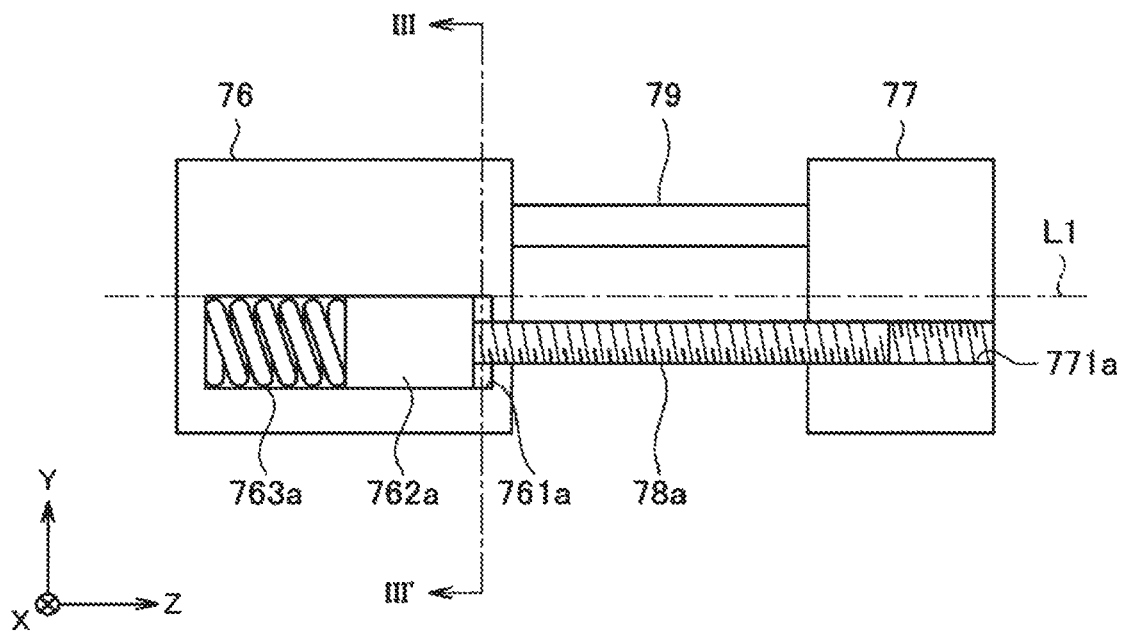
FIG. 12 is an example of a schematic cross-sectional view of the drive section illustrated in FIG. 11 along line II-II'.
Figure 13:
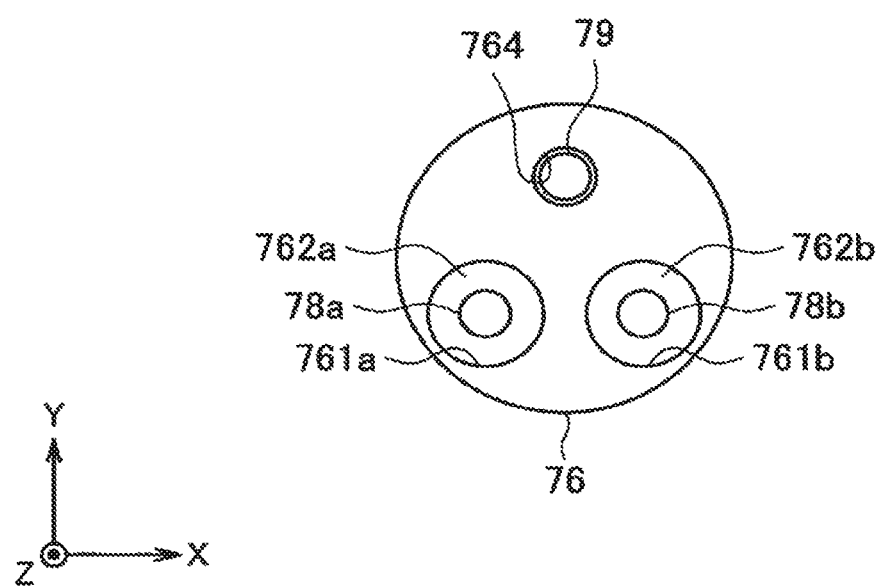
FIG. 13 is an example of a schematic cross-sectional view of the drive section illustrated in FIG. 12 along line III-III'.

In FIGS. 11 to 13, the z direction corresponds to the axial direction L0 illustrated in FIG. 6, the x direction and the y direction are directions which are orthogonal to each other and vertical to the axial direction L0. In the following description, for the sake of convenience, in a front view and a plane view of the drive section 17' illustrated in FIG. 11, a right direction is also referred to as a "+z direction," and a left direction is also referred to as a "−z direction." Similarly, in the front view and a side view of the drive section 17' illustrated in FIG. 8, an upward direction is also referred to as a "+y direction," and a downward direction is also referred to as a "−y direction." Further, in the plane view of the drive section 17' illustrated in FIG. 8, an upward direction is also referred to as a "+x direction," and a downward direction is also referred to as a "−x direction."

As illustrated in FIG. 11, the drive section 17' includes a base member 76, bendable screw members 78a and 78b, a bendable support member 79, and a moved member 77.

As illustrated in FIG. 11, each of the base member 76 and the moved member 77 has a substantially cylindrical shape. Reference numeral L1 in FIG. 11 indicates a central axis of the base member 76 and the moved member 77. In other words, in the example illustrated in FIG. 11, the base member 76 and the moved member 77 are illustrated so that the z direction is an axial direction L1.

The bendable support member 79 is an elongated member having a cylindrical shape. Further, the bendable screw members 78a and 78b are elongated members having a cylindrical shape, and screw threads are spirally formed on side surfaces thereof in the longitudinal direction (that is, formed as male threads). For example, the bendable support member 79 and the bendable screw members 78a and 78b are configured to be bendable, for example, using an elastic material such as rubber or silicone.

Further, as illustrated in the side view of FIG. 11, opening 77a, 771b, and 772 are formed in the moved member 77 in the z direction to be eccentric in different directions with respect to the central axis L0.

One end portion of the bendable support member 79 fits into the opening 772. Accordingly, the bendable support member 79 is held to the −z direction side of the moved member 77 to extend in the −z direction. At this time, the bendable support member 79 is fixed to the moved member 77 by the friction force generated between the side surface of the bendable support member 79 and the inner surface of the opening 772. As another example, the bendable support member 79 may be fixed to the moved member 77 by bonding the side surface of the bendable support member 79 and the inner surface of the opening 772, for example, using an adhesive or the like.

Further, as illustrated in FIG. 12, a screw thread is spirally formed on the inner surface of the opening 771a in the z direction (that is, formed as a female thread). The bendable screw member 78a is screwed into the opening 771a so that the screw thread formed on the side surface of the opening 771a and the screw thread formed on the side surface of the bendable screw member 78a are fitted. Accordingly, the bendable screw member 78a is held to the −z direction side of the moved member 77 to extend in the −z direction. Through this configuration, when the bendable screw member 78a is driven to rotate using the z direction as an axis, a relative position of the moved member 77 with respect to the bendable screw member 78a is shifted in the z direction.

Similarly, a screw thread is spirally formed on the inner surface of the opening 771b in the z direction (that is, formed as a female thread). The bendable screw member 78b is screwed into the opening 771b so that the screw thread formed on the inner side surface of the opening 771b and the screw thread formed on the side surface of the bendable screw member 78b are fitted. Accordingly, the bendable screw member 78b is held to the −z direction side of the moved member 77 to extend in the −z direction. Through this configuration, when the bendable screw member 78b is driven to rotate using the z direction as an axis, a relative position of the moved member 77 with respect to the bendable screw member 78b is shifted in the z direction.

In the examples illustrated in FIGS. 11 to 13, the opening 771a, 771b, and 772 are formed to penetrate the moved member 77 in the z direction but not necessarily limited to the same configuration when an opening is formed on the −z direction side of the moved member 77 (that is, the side facing the base member 76).

As illustrated in FIGS. 12 and 13, in the base member 76, a space section 761a is formed to extend in the z direction at a position opposite to the opening 771a of the moved member 77. A motor 762a and an elastic member 763a are stored in the space section 761a.

On the +z direction side of the motor 762a, an end portion opposite to the end portion fitted with the opening 771a of the moved member 77 among the both end portions of the bendable screw member 78a is held to the rotary shaft of the motor 762a. In other words, the bendable screw member 78a is formed to bridge the base member 76 and the moved member 77. Further, when the motor 762a is driven, the bendable screw member 78a rotates using the z direction as an axis, and the relative position of the moved member 77 with respect to the bendable screw member 78a is shifted in the z direction by the rotation.

Further, the motor 762a is held in the space section 761a to be displaceable in the z direction. Further, the elastic member 763a holds the motor 762a so that the motor 762a is biased in the +z direction. Through this configuration, for example, even when a load according to external pressure is applied to the bendable screw member 78a, the motor 762a is shifted in the z direction, and the elastic member 763a holds the motor 762a by the elastic force, whereby the bendable screw member 78a can be prevented from damaged.

Similarly, in the base member 76, a space section 761b is formed to extend in the z direction at a position opposite to the opening 771b of the moved member 77. A motor 762b and an elastic member 763b are stored in the space section 761b.

On the +z direction side of the motor 762b, of the both end portions of the bendable screw member 78b, an end portion on the side opposite to the end portion fitted with the opening 771b of the moved member 77 is held to the rotary shaft of the motor 762b. In other words, the bendable screw member 78b is formed to bridge the base member 76 and the moved member 77. Further, when the motor 762b is driven, the bendable screw member 78b rotates using the z direction as an axis, and the relative position of the moved member 77 with respect to the bendable screw member 78b is shifted in the z direction by the rotation.

Further, the motor 762b is held in the space section 761b to be displaceable in the z direction. Further, the elastic member 763b holds the motor 762b so that the motor 762b is biased in the +z direction. Through this configuration, for example, even when a load according to external pressure is applied to the bendable screw member 78b, the motor 762b is shifted in the z direction, and the elastic member 763b holds the motor 762b by the elastic force, whereby the bendable screw member 78b can be prevented from damaged.

Further, as illustrated in FIGS. 12 and 13, in the base member 76, an opening 764 is formed to extend in the z direction at a position opposite to the opening 772 of the moved member 77.

In the opening 764, of both end portions of the bendable support member 79, the end portion on the side opposite to the end portion fitted with the opening 772 of the moved member 77 is fitted. Accordingly, the bendable support member 79 is held to the +z direction side of the base member 76 to extend in the +z direction. In other words, the bendable support member 79 is formed to bridge the base member 76 and the moved member 77. At this time, the bendable support member 79 is fixed to the base member 76 by the friction force generated between the side surface of the bendable support member 79 and the inner surface of the opening 764. As another example, the bendable support member 79 may be fixed to the base member 76 by bonding the side surface of the bendable support member 79 and the inner surface of the opening 764, for example, using an adhesive or the like.

As described above, in the movable section 17' illustrated in FIGS. 11 to 13, each of the bendable screw members 78a and 78b and the bendable support member 79 is formed to bridge the base member 76 and the moved member 77 in the z direction. Further, the movable section 17' can shift a part of the moved member 77 in the z direction by each of the bendable screw members 78a and 78b by individually driving each of the bendable screw members 78a and 78b through the motors 762a and 762b. In other words, the movable section 17' controls the relative direction of the moved member 77 with respect to the base member 76 by bending the bendable screw members 78a and 78b and the moved member 77 using the configuration described above.

As a specific example, both of the bendable screw members 78a and 78b are assumed to be driven to shift the moved member 77 in the −z direction. At this time, the −y direction side of the moved member 77 is shifted in the −z direction by the bendable screw members 78a and 78b. On the other hand, the +y direction side of the moved member 77 is held to the +y direction side of the base member 76 via the bendable support member 79. Therefore, the bendable screw members 78a and 78b and the bendable support member 79 are bent, and the moved member 77 moves to the −y direction side with respect to the axial direction (for example, the z direction) of the base member 76.

Further, both of the bendable screw members 78a and 78b are assumed to be driven to shift the moved member 77 in the +z direction. At this time, the −y direction side of the moved member 77 is shifted in the +z direction by the bendable screw members 78a and 78b. On the other hand, the +y direction side of the moved member 77 is held to the +y direction side of the base member 76 via the bendable support member 79. Therefore, the bendable screw members 78a and 78b and the bendable support member 79 are bent, and the moved member 77 moves in the +y direction with respect to the axial direction (for example, the z direction) of the base member 76.

Further, of the bendable screw members 78a and 78b, only the bendable screw member 78a is assumed to be driven to shift the moved member 77 in the +z direction. At this time, the −x direction side of the moved member 77 is shifted in the +z direction by the bendable screw member 78a. On the other hand, the +x direction side of the moved member 77 is held to the +x direction side of the base member 76 via the bendable screw member 78b. Therefore, the bendable screw members 78a and 78b and the bendable support member 79 are bent, and the moved member 77 moves in the +x direction with respect to the axial direction (for example, the z direction) of the base member 76. At this time, it is possible to cause the moved member 77 to further move in the +x direction by driving the bendable screw member 78b to shift the moved member 77 in the −z direction and shifting the −x direction side of the moved member 77 in the −z direction.

Similarly, of the bendable screw members 78a and 78b, only the bendable screw member 78b is assumed to be driven to shift the moved member 77 in the −z direction. At this time, the +x direction side of the moved member 77 is shifted in the +z direction by the bendable screw member 78b. On the other hand, the −x direction side of the moved member 77 is held to the −x direction side of the base member 76 via the bendable screw member 78a. Therefore, the bendable screw members 78a and 78b and the bendable support member 79 are bent, and the moved member 77 moves in the −x direction with respect to the axial direction (for example, the z direction) of the base member 76. At this time, it is possible to cause the moved member 77 to further move in the −x direction by driving the bendable screw member 78a to shift the moved member 77 in the −z direction and shifting the +x direction side of the moved member 77 in the −z direction.

Another example of the configuration of the drive section 17 for bending the bendable section 13 has been described above with reference to FIGS. 11 to 13.

The configuration of the drive section 17 described with reference to FIGS. 8 to 13 is merely an example, and the configuration of the drive section 17 is not particularly limited as long as the bendable section 13 can be bent. It will be appreciated that a position at which the drive section 17 is arranged with respect to the bendable section 13 and the number of drive sections 17 are not particularly limited.

[1.4. External Unit]

Next, an example of the external unit 2 connectable to the imaging device 1 according to the present embodiment will be described. As described above, in the imaging device 1 according to the present embodiment, the connection terminal 141 is formed in the reinforcing section 14, and the external unit 2 can be connected via the connection terminal 141.

Figure 14:
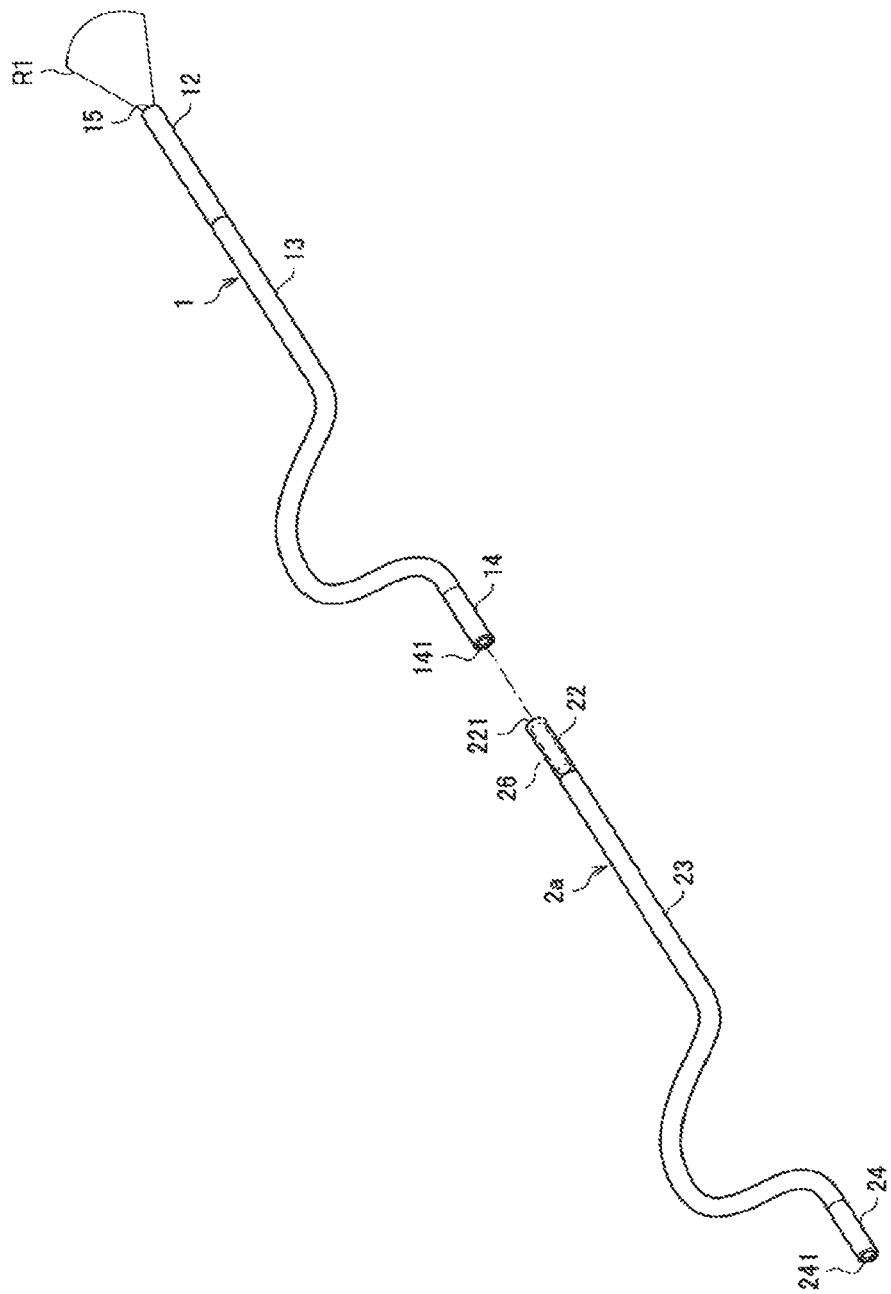
FIG. 14 is an explanatory diagram for describing an example of an external unit connected to the imaging device according to the embodiment.

For example, FIG. 14 is an explanatory diagram for describing an example of the external unit 2 connected to the imaging device 1 according to the present embodiment. In the following description, the external unit 2 illustrated in FIG. 14 is also referred to as an "external unit 2a" to be distinguished from other external units 2.

The external unit 2a illustrated in FIG. 14 is configured to be bendable, similarly to the imaging device 1. In other words, the external unit 2a includes an elongated (so-called cable-like) bendable section 23 configured to be bendable and reinforcing sections 22 and 24 arranged at end portions in a longitudinal direction in which the bendable section 23 extends. The reinforcing sections 22 and 24 are configured to have higher rigidity (that is, higher strength) than the bendable section 23, and has a shape which is maintained without being deformed even in a situation in which the bendable section 23 is bent by the external pressure.

Further, a circuit section 26 is arranged in the reinforcing section 22. For example, the circuit section 26 may be configured with a so-called microcomputer, similarly to the circuit section 16 of the imaging device 1. Further, the circuit section 26 may be configured with a processor such as a CPU, a GPU, a DSP, or an SoC.

Further, a device for implementing various kinds of functions may be arranged in the circuit section 26. For example, the circuit section 26 may include a communication device for performing transmission and reception of information with an external device via a wireless communication path on the basis of a standard such as Wireless Fidelity (Wi-Fi) (a registered trademark) or Bluetooth (a registered trademark).

Further, A connection terminal 221 for connecting the imaging device 1 or another external unit 2a is arranged in the reinforcing section 22. Similarly, a connection terminal 241 for connecting another external unit 2a is arranged in the reinforcing section 24. Further, various kinds of components (for example, the circuit section 26 and the connection terminal 221) arranged in the reinforcing section 22 are connected with various kinds of components (for example, the connection terminal 241) arranged in the reinforcing section 24 via various kinds of wirings arranged in the bendable section 23.

In other words, the external unit 2a illustrated in FIG. 14 is configured to be connectable to the connection terminal 141 of the imaging device 1. Further, the external unit 2a may be configured so that the connection terminal 221 of another external unit 2a is connectable to the connection terminal 241. Through this configuration, for example, a plurality of external units 2a may be connected to the imaging device 1 in series.

In the example illustrated in FIG. 14, the circuit section 26 is arranged in the reinforcing section 22, but a position at which the circuit section 26 is arranged is not necessarily to the reinforcing section 22 as long as the circuit section 26 is arranged in a portion having higher rigidity than the bendable section 23. As a specific example, a part or all of the circuit section 26 may be arranged on the reinforcing section 24 side. This similarly applies to the connection terminal 241. In other words, the connection terminal 241 may be arranged on the reinforcing section 22 side or may be arranged in each of the reinforcing sections 22 and 24.

Further, a different device may be arranged for each external unit 2a as various types of devices arranged for the circuit section 26 of the external unit 2a.

For example, a communication device for implementing wireless communication based on the Wi-Fi standard or the Bluetooth standard may be arranged in the circuit section 26 of some external units 2a. The wireless communication function may be extended for the imaging device 1 by connecting the external unit 2a to the connection terminal 141 of the imaging device 1.

Similarly, a device for acquiring the position information of the external unit 2a such as the GPS may be arranged in the circuit section 26 of another external unit 2a. A function of detecting position information may be extended for the imaging device 1 by connecting the external unit 2a to the connection terminal 141 of the imaging device 1.

Of course, functions which can be extended in accordance with the external unit 2a by connecting various kinds of external units 2a to the connection terminal 141 of the imaging device 1 are not limited to only the wireless communication function or the position information detection function. For example, a storage section may be arranged in the circuit section 26 of the external unit 2a so that the imaging device 1 can use the connected external unit 2a as an extension area for storing data.

As another example, various kinds of sensors for detecting a change in a position or a direction of a housing of the external unit 2a may be arranged in the external unit 2a. Examples of various kinds of sensors include an acceleration sensor, a gyro sensors, and a geomagnetic sensor. By connecting the external unit 2a as described above, the imaging device 1 can use information indicating the change in the position or the direction of the housing of the external unit 2a for controlling the imaging device 1 (for example, controlling the direction of the imaging section 15).

As another example, the imaging device 1 may enable a connected external unit 2a to be used as an additional battery unit. As another example, the external unit 2a may be configured as an extension unit for extending the bendable section. As another example, an external unit 2a in which the bendable section 23 is configured to be bendable by the drive section may be connected to the imaging device 1.

As another example, an output section for outputting various kinds of information may be arranged in the external unit 2a. As a specific example, an external unit 2a in which a so-called display for displaying target display information is arranged as the output section may be used. By connecting the external unit 2a, the imaging device 1 is able to output, for example, an image (or a live view image) captured by the imaging section 15 to the output section of the external unit 2a. Through this configuration, the imaging device 1 according to the present embodiment need not necessarily include the output section (for example, the display).

It will be appreciated that a plurality of functions can be extended for the imaging equipment 1 by connecting a plurality of external units 2a in series.

Figure 15:
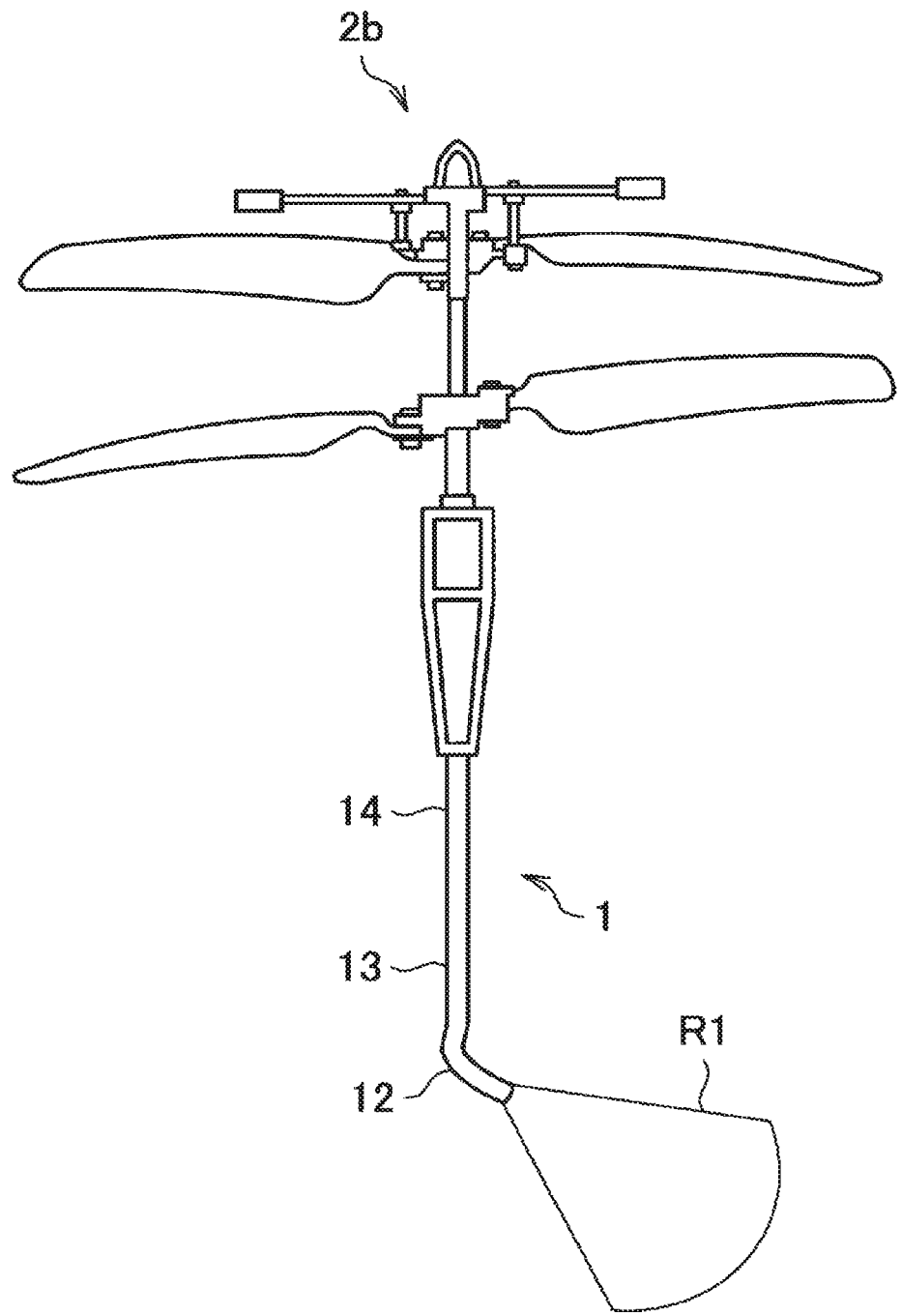
FIG. 15 is an explanatory diagram for describing another example of the external unit connected to the imaging device according to the embodiment.

FIG. 15 is an explanatory diagram for describing another example of the external unit 2 connected to the imaging device 1 according to the present embodiment. In the following description, the external unit 2 illustrated in FIG. 15 is also referred to as an "external unit 2b" to be distinguished from other external units 2.

The external unit 2b has a drive section and is configured to move when the drive section is driven. For example, in an example illustrated in FIG. 15, the external unit 2b includes a flight mechanism such as a propeller as the drive section and is configured to fly and move through the flight mechanism.

When the external unit 2b including the drive section is connected to the imaging device 1 according to the present embodiment, it is possible to move the imaging device 1 through the drive section of the external unit 2b. For example, the external unit 2b may be configured to operate on the basis of an instruction given via a wireless communication path from the information processing terminal 3 such as a smartphone or a dedicated controller. Further, the external unit 2b may be configured to autonomously move on the basis of a detection result by various kinds of sensors when various kinds of sensors are arranged in the external unit 2b.

Through this configuration, the user can cause the imaging device 1 to capture an image at an angle of view which is difficult to be implemented through hands by connecting the external unit 2b to the imaging device 1 and operating the external unit 2b.

In the example illustrated in FIG. 15, for example, a control entity for various kinds of operations of the imaging device 1 such as an image captured by the imaging section 15, control of the angle of view of the imaging section 15 with the bending of the bendable section 13, and zooming control of the imaging section 15 is not particularly limited. As a specific example, the user may control the operation of imaging device 1 through the information processing terminal 3 such as a smartphone.

As another example, the external unit 2b may control the operation of the imaging device 1, for example, by performing transmission and reception of various kinds of control signals with the imaging device 1 via the connection terminal 141. In this case, the external unit 2b may receive an instruction from the user via the information processing terminal 3 such as smartphone and control the operation of the imaging device 1. As another example, the external unit 2b may autonomously control the operation of the imaging device 1 on the basis of the detection result by various kinds of sensors.

Further, depending on the shape of the connection terminal connecting the imaging device 1 with the external unit 2, the external unit 2 may be rotatably held to the imaging device 1, for example, in a circumferential direction in which the axial direction L0 illustrated in FIG. 1 serves as an axis. On the other hand, a situation in which the imaging device 1 supposedly rotates with respect to the external unit 2 as in the case of the example illustrated in FIG. 15 may not be desirable. Therefore, for example, a mechanism for suppressing rotation in the circumferential direction in which the axial direction L0 serves as an axis (for example, a structure of holding the relative position relation between connected units or the like as they are engaged with each other) may be arranged in the connection terminals 221 and 241 of the external unit 2 and the connection terminal 141 of the imaging device 1, The external unit 2 described above is merely an example and not necessarily limited to the same configuration. As a specific example, the external unit 2 may be configured as a charging unit for charging a power source (battery) arranged in the bendable section 13 of the imaging device 1 or as a connector for a connection with the charging unit. As another example, the external unit 2 may be configured as a connector for a connection with an external device such as a personal computer (PC).

An example of the external unit 2 connectable to the imaging device 1 according to the present embodiment has been described above with reference to FIGS. 14 and 15.

<2. Modified Examples>

As described above, in the imaging device 1 according to the present embodiment, the drive section 17 is arranged in the bendable section 13, and thus it is possible to autonomously control the direction in which the imaging section 15 captures the image by controlling the operation of the drive section 17 through the circuit section 16. In this regard, as a modified example of the imaging device 1 according to the present embodiment, an example of a mechanism in which the imaging device 1 detects the position of the subject and controls the direction of the imaging section 15 such that the imaging section 15 follows the position of the subject on the basis of the detection result will be described.

[2.1. First Modified Example: Follow-Up Control Based on Detection of Wireless Signal]

Figure 16:
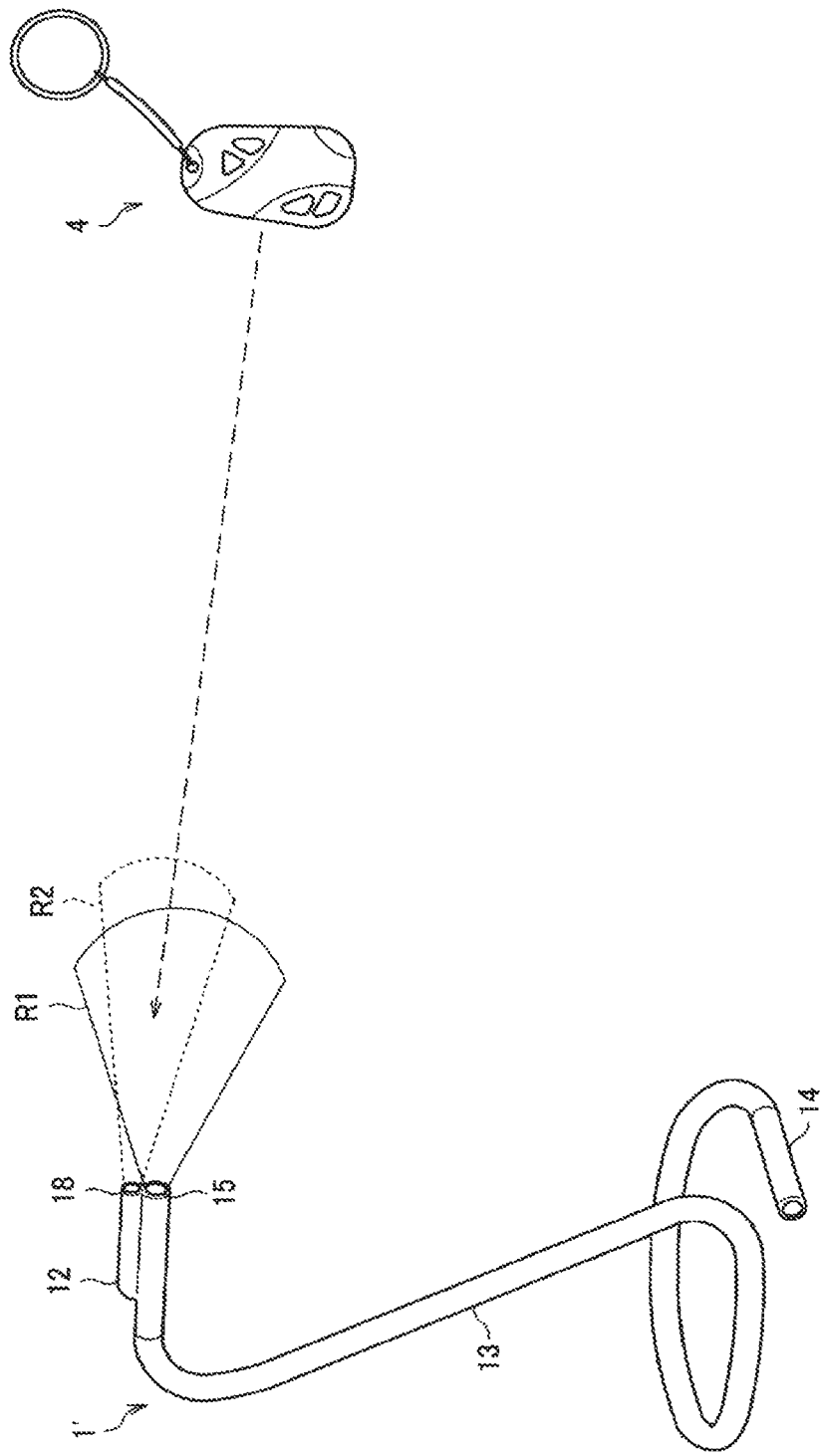
FIG. 16 is an explanatory diagram for describing an example of an operation of an imaging device according to a first modified example.
Figure 17:
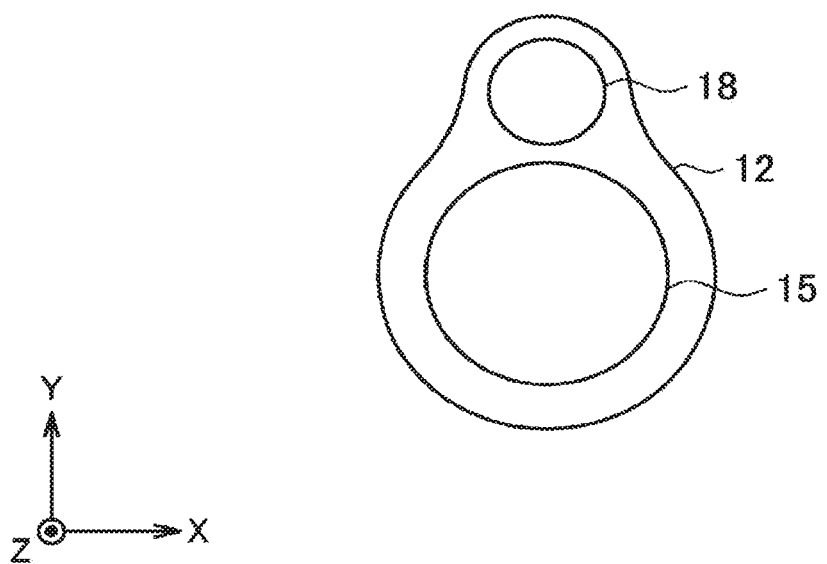
FIG. 17 is an explanatory diagram for describing an example of an operation of an imaging device according to a first modified example.

First, an example of an operation of the imaging device according to a first modified example will be described with reference to FIGS. 16 and 17. FIG. 16 and FIG. 17 are explanatory diagrams for describing an example of an operation of the imaging device according to the first modified example. In the following description, the imaging device according to the first modified example is also referred to as an "imaging device 1'" to be distinguished from the imaging device 1 according to the above-described embodiment.

As illustrated in FIG. 16, in the imaging device 1' according to the first modified example, an antenna 18 having directivity which is capable of receiving a wireless signal having a predetermined frequency band is arranged in the reinforcing section 12. The antenna 18 can be configured as, for example, a so-called helical antenna. Further, in FIG. 16, reference numeral R2 schematically indicates a range in which the antenna 18 can receive a wireless signal (hereinafter also referred to as a "reception range R2").

It is desirable that the antenna 18 be held in the reinforcing section 12 so that the reception range R2 faces in the same direction as the imaging range R1 of the imaging section 15 as illustrated in FIG. 16.

For example, FIG. 17 illustrates an example of a schematic configuration of the reinforcing section 12 when the end portion of the reinforcing section 12 of the imaging device 1' is viewed in the axial direction L0 (that is, when viewed in the direction in which the imaging section 15 images the subject). In FIG. 17, the z direction indicated by the depth direction corresponds to the axial direction L0 illustrated in FIG. 1. In other words, in the example illustrated in FIG. 17, the imaging section 15 and the antenna 18 are held to the reinforcing section 12 so that the direction in which the imaging section 15 captures an image and the direction of the directivity of the antenna 18 are oriented in the z direction (that is, the axial direction L0).

Then, for example, the circuit section 16 of the imaging device 1' according to the first modified example controls the direction of the reinforcing section 12 to which the antenna 18 and the imaging section 15 are held by driving the drive section 17 on the basis of a result of detecting a signal having a predetermined frequency band through the antenna 18.

Specifically, the circuit section 16 monitors strength of the signal received through the antenna 18 while controlling the direction of the reinforcing section 12 by driving the drive section 17, and searches for a direction in which the antenna 18 receives a signal having higher strength.

Through this configuration, for example, when a signal transmitting terminal 4 that oscillates the wireless signal of the frequency band to be received by the antenna 18 is held in the subject, the circuit section 16 of the imaging device 1' can perform control such that the direction of the imaging section 15 faces in the direction of the subject (that is, so that the subject is included in the imaging range R1). At this time, the circuit section 16 of the imaging device 1' can control the direction of the imaging section 15 to follow the subject in accordance with motion of the subject by continuously monitoring the strength of the received wireless signal and sequentially controlling the direction of the reinforcing section 12 on the basis of the monitoring result.

The antenna 18 may be configured to control a width of the reception range R2 (that is, such that the directivity is changed). Through this configuration, for example, when the imaging device 1' performs control such that the reception range R2 of the antenna 18 becomes wider, roughly recognizes a coming direction of the wireless signal, and narrows down the range of the reception range R2 gradually, it is possible to adjust the direction of the imaging section 15 more precisely.

An example of the operation of the imaging device according to the first modified example has been described above with reference to FIGS. 16 and 17.

[2.2. Second Modified Example: Follow-Up Control Based on Detection of Infrared Light]

Figure 18:
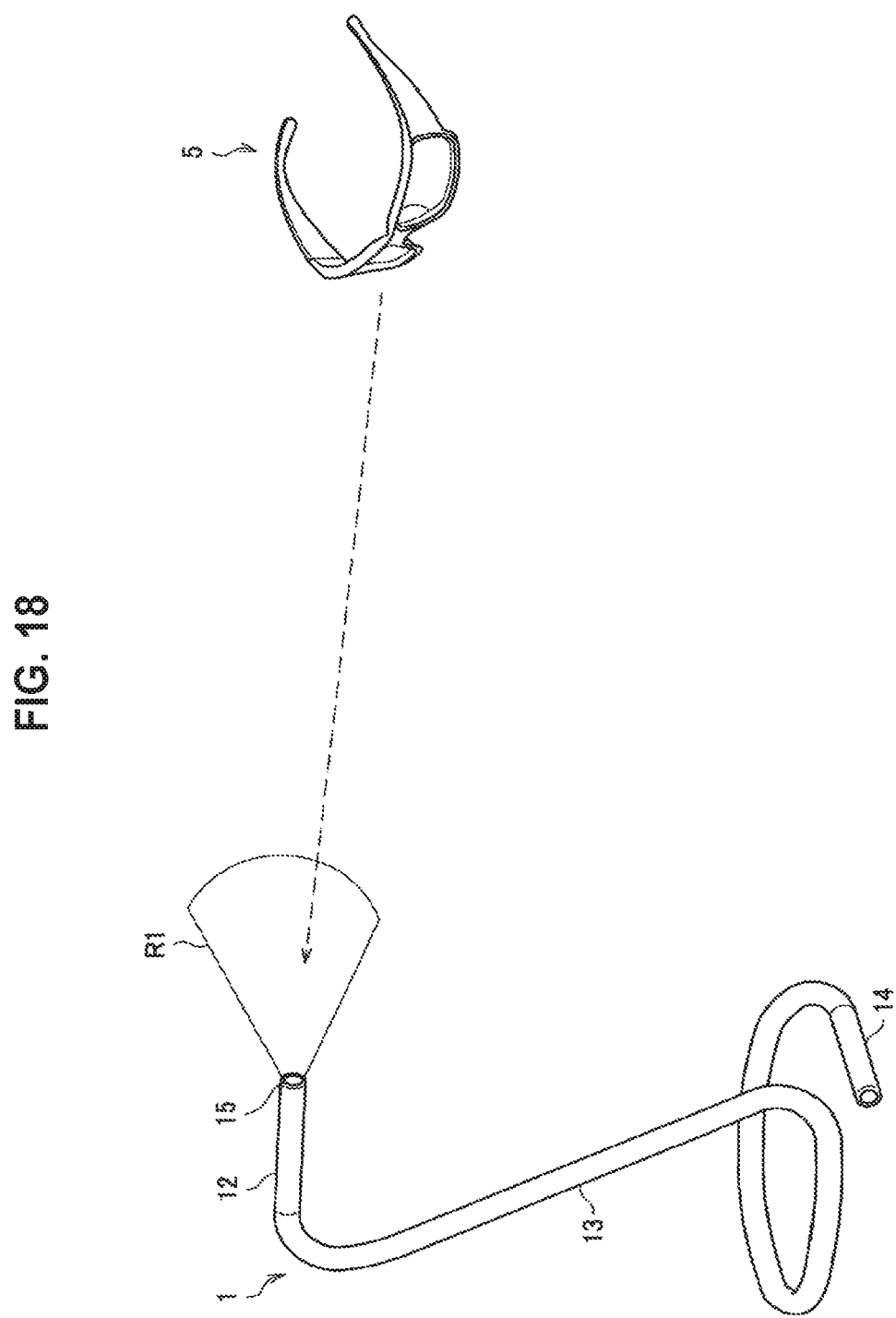
FIG. 18 is an explanatory diagram for describing an example of an operation of an imaging device according to a second modified example.

Next, an example of an operation of the imaging device according to a second modified example will be described with reference to FIGS. 18 and 19. For example, FIG. 18 is an explanatory diagram for describing an example of the operation of the imaging device according to the second modified example.

For example, the circuit section 16 of the imaging device 1 according to the second modified example controls the direction of the reinforcing section 12 in which the imaging section 15 is held by detecting an infrared signal transmitted from a terminal 5 which the user can wear on his/her body such as a wearable terminal and driving the drive section 17 on the basis of the detection result.

Specifically, the circuit section 16 monitors a detection result of the infrared signal while controlling the direction of the reinforcing section 12 by driving the drive section 17, and searches for a direction in which the infrared signal (that is, the infrared signal transmitted from the terminal 5) is detected.

Through this configuration, the circuit section 16 of the imaging device 1 can perform control such that the direction of the imaging section 15 (that is, the direction of the imaging range R1) faces in the direction of the subject (that is, the coming direction of the infrared signal transmitted from the terminal 5). At this time, the circuit section 16 of the imaging device 1 can control the direction of the imaging section 15 to follow the subject in accordance with motion of the subject by continuously monitoring the detection result of the infrared signal and sequentially controlling the direction of the reinforcing section 12 on the basis of the monitoring result.

In order to implement the control according to the second modified example described above, it is desirable that the imaging device 1 be configured so that the direction in which the infrared signal is detected faces in a similar direction to the imaging range R1 of the imaging section 15. Therefore, for example, when the imaging element 153 of the imaging section 15 includes a detecting element that detects an infrared signal, the circuit section 16 may use a detection result of the detecting element.

Figure 19:
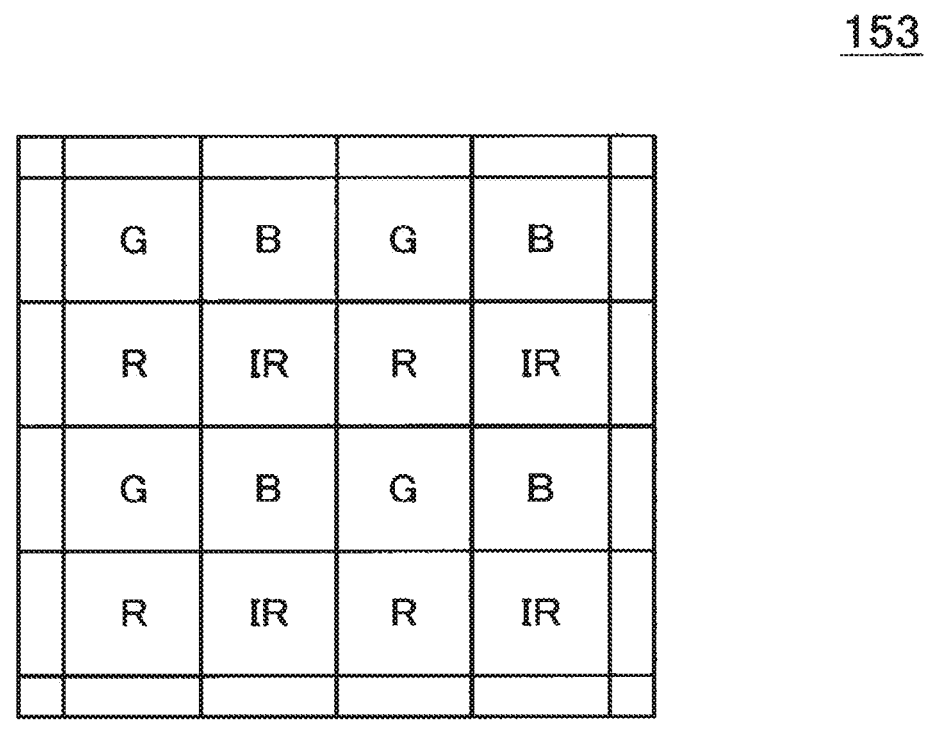

For example, FIG. 19 illustrates an example of the imaging element 153 equipped with a detecting element that detects an infrared signal. In other words, in the example illustrated in FIG. 19, the imaging element 153 includes an image sensor that detects the infrared signal indicated by reference numeral IR in addition to an image sensor that detects light of each of RGB.

As illustrated in FIG. 19, the imaging element 153 includes a detecting element (for example, an image sensor) that detects the infrared signal, and it is possible to perform control such that the imaging section 15 faces in the direction of the terminal 5 (that is, such that the subject is included in the imaging range R1) by controlling the direction of the imaging section 15 such that the infrared signal transmitted from the terminal 5 is detected by the detecting element.

Further, a type of device that detects the infrared signal or a position of the device is not particularly limited when it is possible to perform control such that the imaging section 15 faces in the direction of the terminal 5 by controlling the direction of the imaging section 15 such that the infrared signal transmitted from the terminal 5 is detected. As a specific example, an infrared sensor may be separately arranged in the reinforcing section 12 of imaging device 1.

An example of the operation of the imaging device according to the second modified example has been described above with reference to FIGS. 18 and 19.

[2.3. Third Modified Example: Follow-Up Control Using Three-Point Survey]

Figure 20:
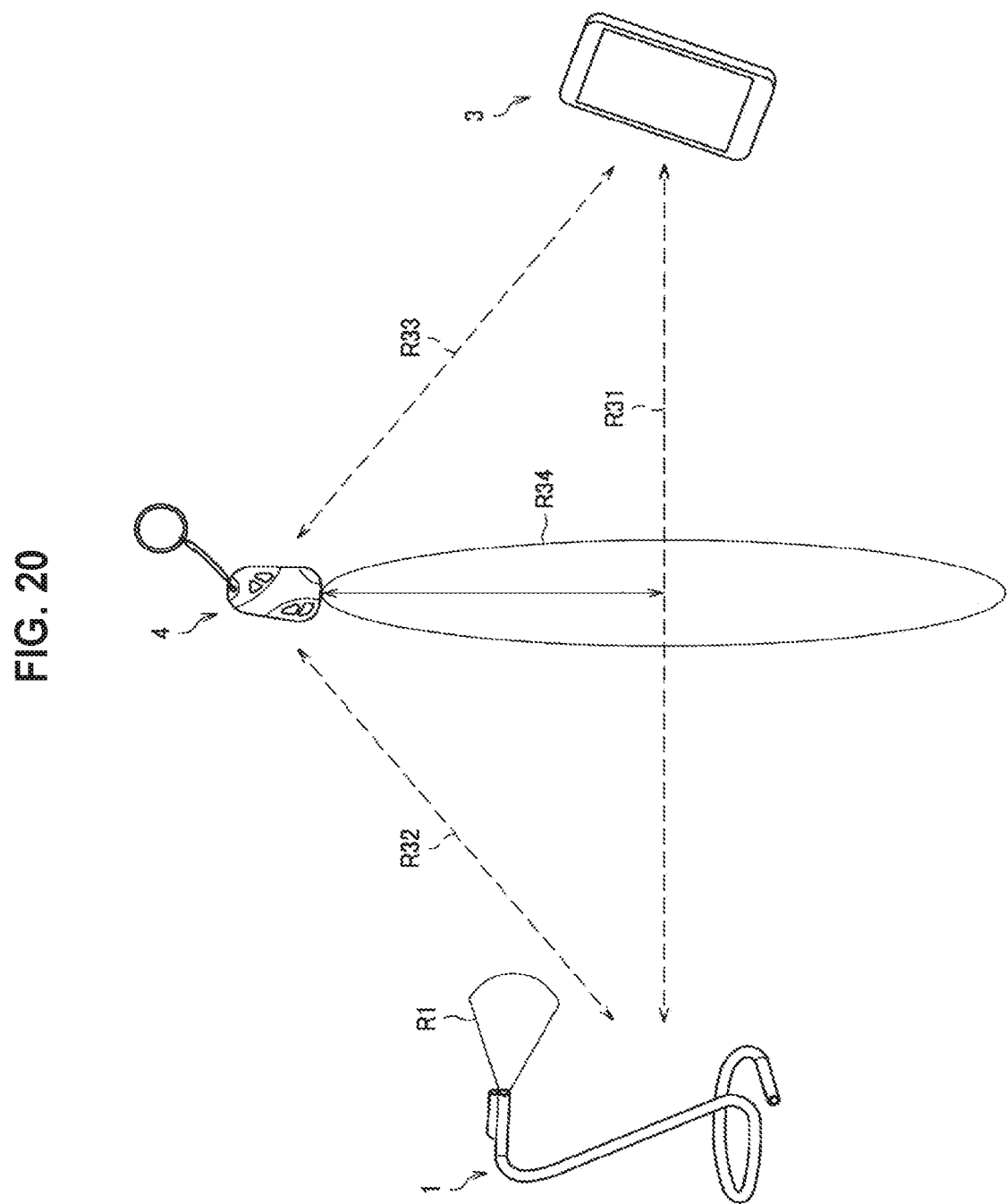
FIG. 20 is an explanatory diagram for describing an example of an operation of an imaging device according to a third modified example.
Figure 21:
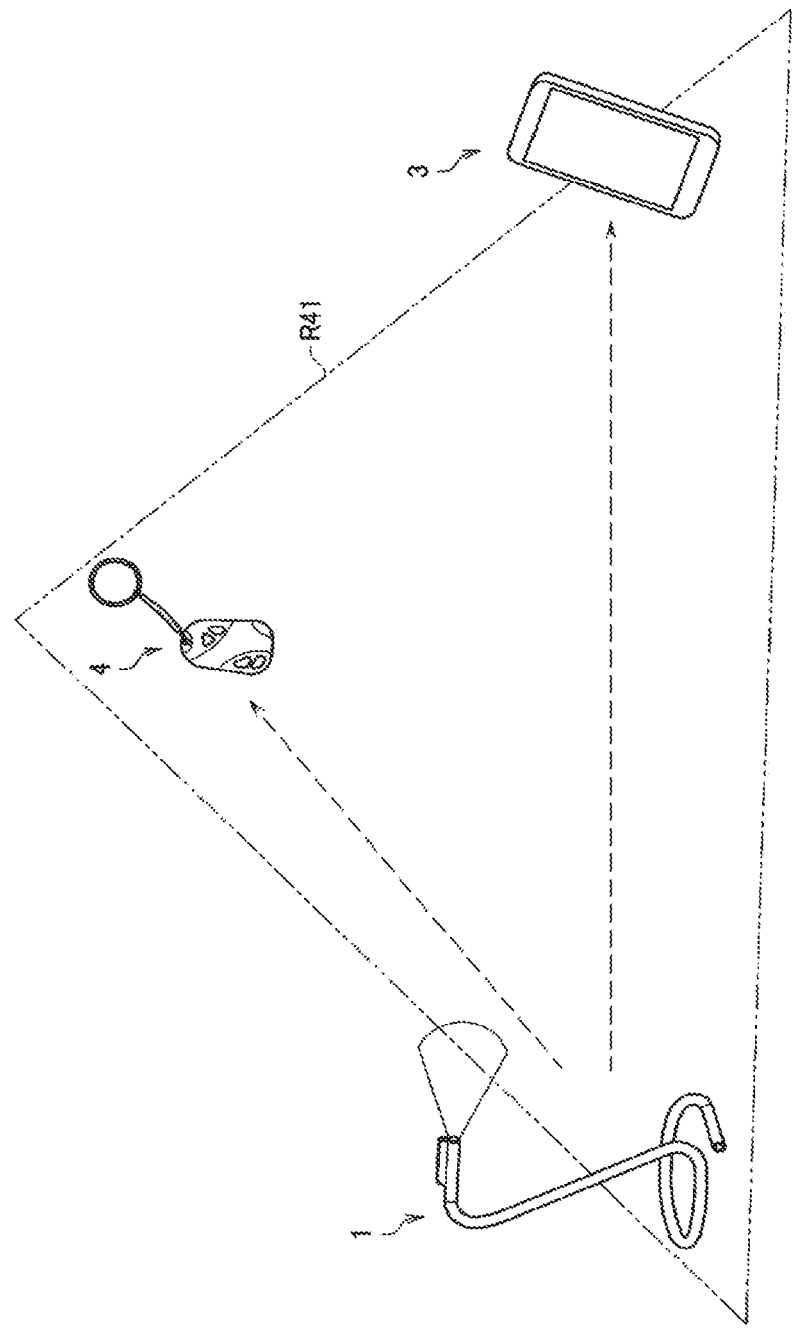
FIG. 21 is an explanatory diagram for describing an example of an operation of an imaging device according to a third modified example.
Figure 22:
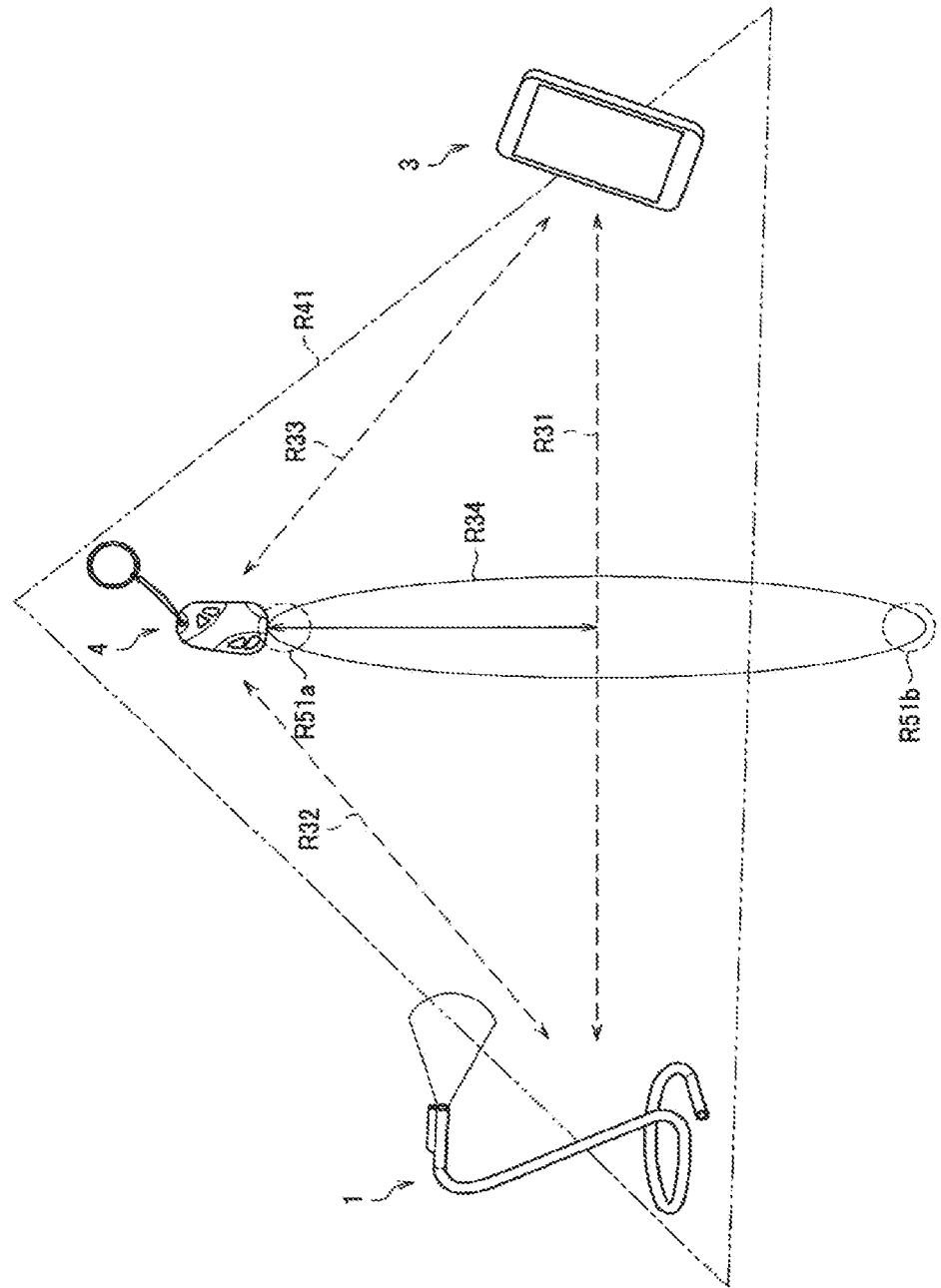
FIG. 22 is an explanatory diagram for describing an example of an operation of an imaging device according to a third modified example.

Next, an example of an operation of the imaging device according to a third modified example will be described with reference to FIGS. 20 to 22. For example, FIGS. 20 to 22 are explanatory diagrams for describing an example of the operation of the imaging device according to the third modified example. In the third modified example, an example of a mechanism that controls the direction of the imaging section 15 such that the imaging device 1 follows the subject according to motion of the subject using a so-called three-point survey will be described.

In FIG. 20, a signal transmitting terminal indicated by reference numeral 4 is a terminal held in the subject. Reference numeral 3 indicates an information processing terminal (for example, a smartphone or the like) different from the imaging device 1 held by the user who performs imaging. As illustrated in FIG. 20, the imaging device 1, the signal transmitting terminal 4, and the information processing terminal 3 are configured to be able to perform transmission and reception of information with one another via a wireless communication path.

In the example illustrated in FIG. 20, for example, the imaging device 1, the signal transmitting terminal 4, and the information processing terminal 3 perform transmission and reception of information with one another to calculate a distance between the respective devices of the imaging device 1, the signal transmitting terminal 4, and the information processing terminal 3 (that is, a linear distance). In the following description, the positions of the imaging device 1 and the information processing terminal 3 among the imaging device 1, the signal transmitting terminal 4, and the information processing terminal 3 are assumed to be fixed.

Further, a calculation method is not particularly limited as long as the distance between the respective devices of the imaging device 1, the signal transmitting terminal 4, and the information processing terminal 3 can be calculated. As a specific example, the distance between the respective device may be calculated on the basis of position information of the respective device measured by the GPS or the like. As another example, the distance between the devices may be calculated on the basis of a difference in an arrival time of wireless signals transmitted and received between the respective devices.

Further, an entity that calculates the distance between the respective device is not particularly limited. As a specific example, the imaging device 1 may calculate the distance between the respective device, or the information processing terminal 3 may calculate the distance between the respective devices. Further, the imaging device 1, the signal transmitting terminal 4, and the information processing terminal 3 may calculate the distance between the respective devices jointly with one another. In the following description, the imaging device 1 is assumed to perform various types of analysis processes such as a calculation including a calculation of the distance between the respective devices.

In FIG. 20, reference numeral R31 indicates a distance between the imaging device 1 and the information processing terminal 3. Reference numeral R32 indicates a distance between the imaging device 1 and the signal transmitting terminal 4. Reference numeral R33 indicates a distance between the information processing terminal 3 and the signal transmitting terminal 4.

The imaging device 1 calculates the position at which the signal transmitting terminal 4 may be located on the basis of the calculated distances R31, R32, and R33. Specifically, as illustrated in FIG. 20, positions on a circumference R34 whose radius is a vertical distance from a straight line connecting the imaging device 1 and the information processing terminal 3 to the signal transmitting terminal 4 are positions at which the signal transmitting terminal 4 may be located.

Next, as illustrated in FIG. 21, the imaging device 1 captures the information processing terminal 3 and the signal transmitting terminal 4 through the imaging section 15 and specifies a direction in which each of the information processing terminal 3 and the signal transmitting terminal 4 is located with respect to the position of the imaging device 1. For example, the information processing terminal 3 and the signal transmitting terminal 4 may be captured through the imaging device 1 on the basis of an operation of the user performed via the information processing terminal 3. Then, the imaging device 1 calculates a virtual plane R41 including the positions of the imaging device 1, the information processing terminal 3, and the signal transmitting terminal 4 on the basis of a result of specifying the direction in which each of the information processing terminal 3 and the signal transmitting terminal 4 is located with respect to the position of the imaging device 1.

Then, the imaging device 1 narrows down the position at which the signal transmitting terminal 4 may be located from the result of calculating the positions at which the signal transmitting terminal 4 may be located (that is, the positions on the circumference R34 illustrated in FIG. 20) and the result of calculating the virtual plane R41. Specifically, as illustrated in FIG. 22, crossing points R51a and R51b of the calculated circumference R34 and the virtual plane R41 are the positions at which the signal transmitting terminal 4 may be located.

Then, the imaging device 1 recognizes that the position indicated by R51a is the position of the signal transmitting terminal 4 on the basis of the position relation between the information processing terminal 3 and the signal transmitting terminal 4 with respect to the imaging device which is specified on the basis of the images of the information processing terminal 3 and the signal transmitting terminal 4 which have been captured previously.

After recognizing the position of the signal transmitting terminal 4, the imaging device 1 controls the direction of the imaging section 15 on the basis of the recognition result such that the imaging section 15 faces in the direction of the signal transmitting terminal 4. Through this configuration, when the signal transmitting terminal 4 is held to the subject, the imaging device 1 can perform control such that the imaging section 15 faces in the direction of the subject (that is, such that the subject is included in the imaging range R1). The imaging device 1 can control the direction of the imaging section 15 to follow the subject in accordance with motion of the subject by continuously monitoring a change in the position of the signal transmitting terminal 4 based on the above-described calculation and sequentially controlling the direction of the reinforcing section 12 on the basis of the monitoring result.

The imaging device 1 may control a zoom (for example, an optical zoom or an electronic zoom) of the imaging section 15. In this case, for example, the imaging device 1 may control a zoom magnification of the imaging section 15 on the basis of an instruction from the user given via the information processing terminal 3. As another example, the imaging device 1 may autonomously control the zoom magnification of the imaging section 15. In this case, for example, the imaging device 1 may recognize the subject on the basis of a so-called user recognition technique (for example, face recognition or the like) and control the zoom magnification of the imaging section 15 in accordance with a size of a region indicating the subject shown within an angle of view.

An example of the operation of the imaging device according to the third modified example has been described above with reference to FIGS. 20 to 22.

Further, it will be appreciated that the process for implementing various kind of operations and controls of imaging device 1 including the examples described as the first to third modified examples may be performed through, for example, the circuit section 16.

Further, the examples described as the first to third modified examples are merely examples and not necessarily limited to the above configurations and controls. As a specific example, the imaging device 1 may use some regions of the imaging element 153 of the imaging section 15 to capture an image and control a region used for capturing an image in accordance with a result of detecting the position of the subject. Through this control, the imaging device 1 can cause the subject to be included in the imaging range R1 without bending the bendable section 13. It will be appreciated that the imaging device 1 may control the direction of the imaging range R1 by combining the control of the direction of the imaging section 15 by the bendable section 13 and the control of the region used for capturing the image in the imaging element 153.

Further, when some regions of the imaging element 153 of the imaging section 15 are used to capture the image, the imaging device 1 may correct an inclination of an image by rotating the region used for capturing an image.

In this case, for example, the imaging device 1 may analyze the image captured by the imaging section 15, detect the subject in the image (for example, a face of a person, a building, a horizon, or the like), and calculate a rotation angle for correction on the basis of a result of detecting the subject. Through this configuration, for example, the imaging device 1 can perform correction so that the inclination of the image captured by the imaging section 15 becomes horizontal.

As another example, a sensor for so-called posture recognition such as a gyro sensor, a geomagnetic sensor or the like may be arranged in the reinforcing section 12 in which the imaging section 15 is arranged, and the imaging device 1 may calculate the rotation angle for correction on the basis of a detection result of the sensor. In this case, it will be appreciated that the imaging device 1 may control the direction of the imaging section 15 such that the imaging section 15 is horizontal to the ground by bending the bendable section 13.

Further, the imaging device 1 may analyze the image captured by the imaging device 15 and control the direction of the imaging range R1 on the basis of the analysis result such that the subject is located at the center of the imaging range R1. At this time, the imaging device 1 may control the direction of the imaging section 15 by bending the bendable section 13 or may control the direction of the imaging range R1 by controlling the region used to capture the image in the imaging element 153.

Further, the imaging device 1 may use a combination of a plurality of techniques to detect the position of the subject. As a specific example, the imaging device 1 may improve the detection accuracy of the position of the subject by combining the technique of detecting the direction of the subject on the basis of the coming direction of the wireless signal which has been described above as the first modified example and the technique of detecting the direction of the subject on the basis of the coming direction of the infrared signal which has been described above as the second modified example. Further, the imaging device 1 may detect the position of the subject by appropriately combining the position detection technology based on the GPS, the user recognition technology based on image processing (for example, the face recognition or the like), and a human body detection technique using various kinds of sensors.

<3. Application Examples>

Next, application examples of the imaging device 1 according to the present embodiment will be described. As described above, the imaging device 1 according to the present embodiment can be applied for various purposes by bending the bendable section 13 in a desired shape. In this regard, in this section, application examples of the imaging device 1 according to the present embodiment will be described using specific examples.

Figure 23:
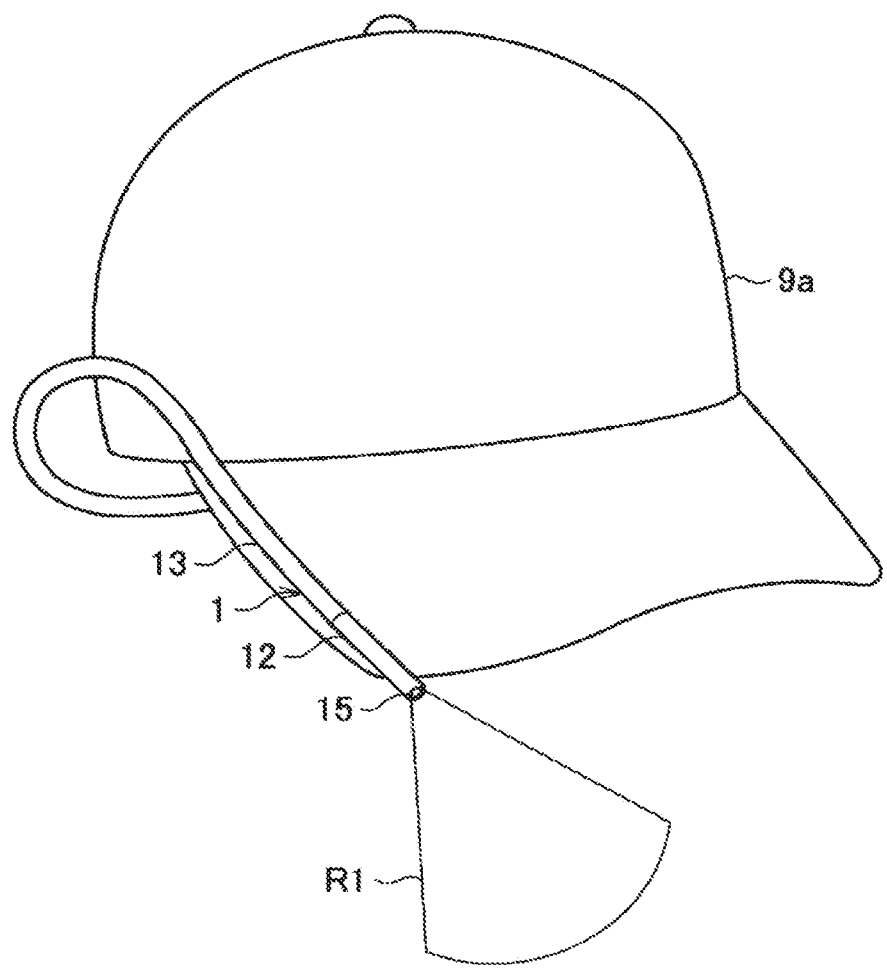
FIG. 23 is an explanatory diagram for describing an application example of an imaging device according to the embodiment.

For example, FIG. 23 is an explanatory diagram for describing an application example of the imaging device 1 according to the present embodiment. In an example illustrated in FIG. 23, the imaging device 1 is installed on a cap 9a such that the bent bendable section 13 is used as a holding member, and the reinforcing section 12 in which the imaging section 15 is arranged is held to a brim portion of the cap 9a. When the imaging device 1 is installed on the cap 9a as illustrated in FIG. 23, the user can capture a video close to his/her field of view in a hands-free manner through the imaging device 1.

Further, a position at which the imaging device 1 can be installed is not limited to the cap illustrated in FIG. 23. In other words, the imaging device 1 according to the present embodiment can be installed at various positions by bending the bendable section 13. As a specific example, the imaging device 1 may be installed on a bag by wrapping the bendable section 13 along a belt of the bag.

Further, since the imaging device 1 according to the present embodiment has a simple structure, it is possible to cause the imaging device 1 to have a waterproof function relatively easily. Specifically, the bendable section 13 is formed in a cable shape having a circular cross section when it is vertically cut in the axial direction L0, and thus each pressure is antagonized against the bendable section 13 in the direction vertical to the axial direction L0. Therefore, due to this structural characteristic, the bendable section 13 is hardly affected by pressure in the direction vertical to the axial direction L0.

On the end portion of the imaging device 1 in the axial direction L0, the reinforcing sections 12 and 14 having higher rigidity than the bendable section 13 are arranged. Therefore, the rigidity (strength) of the reinforcing sections 12 and 14 is adjusted in accordance with water pressure at a depth at which the imaging device 1 can be used through the material or a structure of forming the reinforcing sections 12 and 14, and thus the imaging device 1 can be prevented from being broken by the pressure in the axial direction L0.

Since the imaging device 1 is given the waterproof function using this property, the imaging device 1 can be used in water. As a specific example, for example, the imaging device 1 may be fixed so that the imaging device 1 crawls along a fishing line or a fishing gut by bending the bendable section 13, and an image near a fishhook may be captured by the imaging device 1. Accordingly, for example, the user is able to check the image near the fishhook through a terminal such as a smartphone during fishing.

Further, as described above, the imaging device 1 according to the present embodiment is formed in an elongated shape and can be freely bent, and thus it is possible to image a portion which the hand of the user does not reach such as an inside of a narrow gap or an inside of a tubular object such as a pipe.

Further, it is possible to wear and use the imaging device 1 on a part of the body of the user such as a so-called wearable terminal. For example, FIG. 24 is an explanatory diagram for describing an application example of the imaging device 1 according to the present embodiment and illustrates an example in which the imaging device 1 is worn on a part of the body and used.

Figure 24:
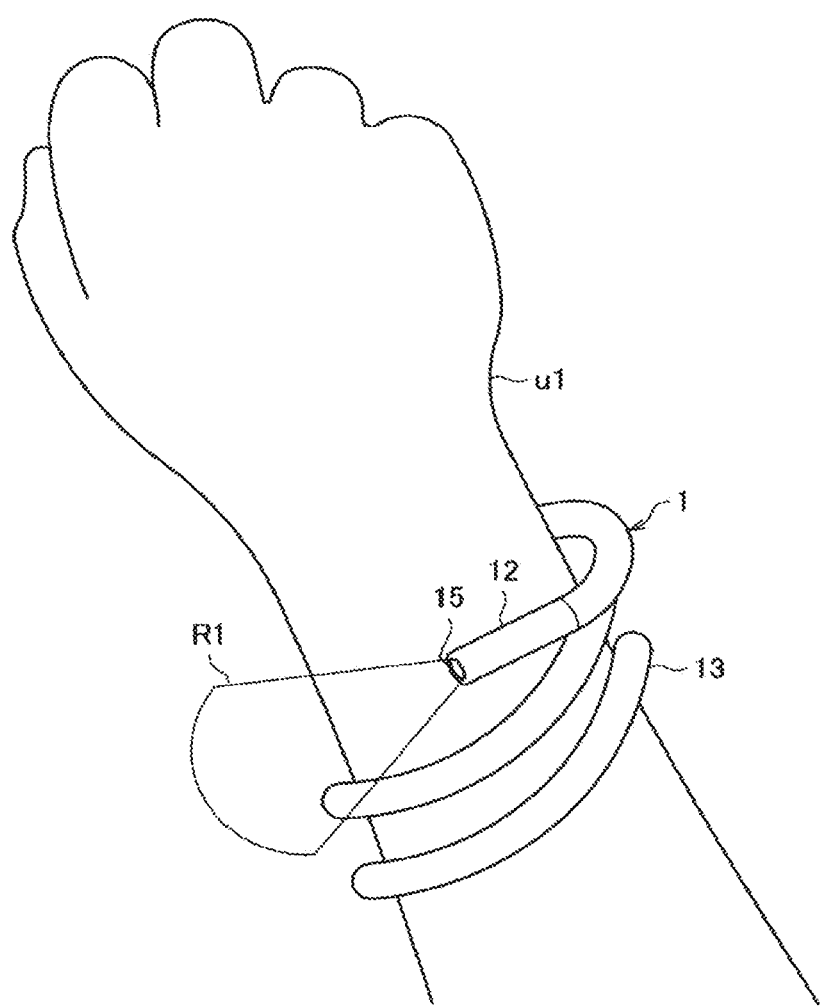
FIG. 24 is an explanatory diagram for describing an application example of an imaging device according to the embodiment.

Specifically, as illustrated in FIG. 24, the imaging device 1 can be worn on a wrist u1 by wrapping the bent bendable section 13 around the wrist u1 of the user. Accordingly, for example, the user can capture his/her own image by wearing the imaging device 1 on the arm, bending the bendable section 13, and orienting the imaging section 15 in the user direction.

Figure 25:
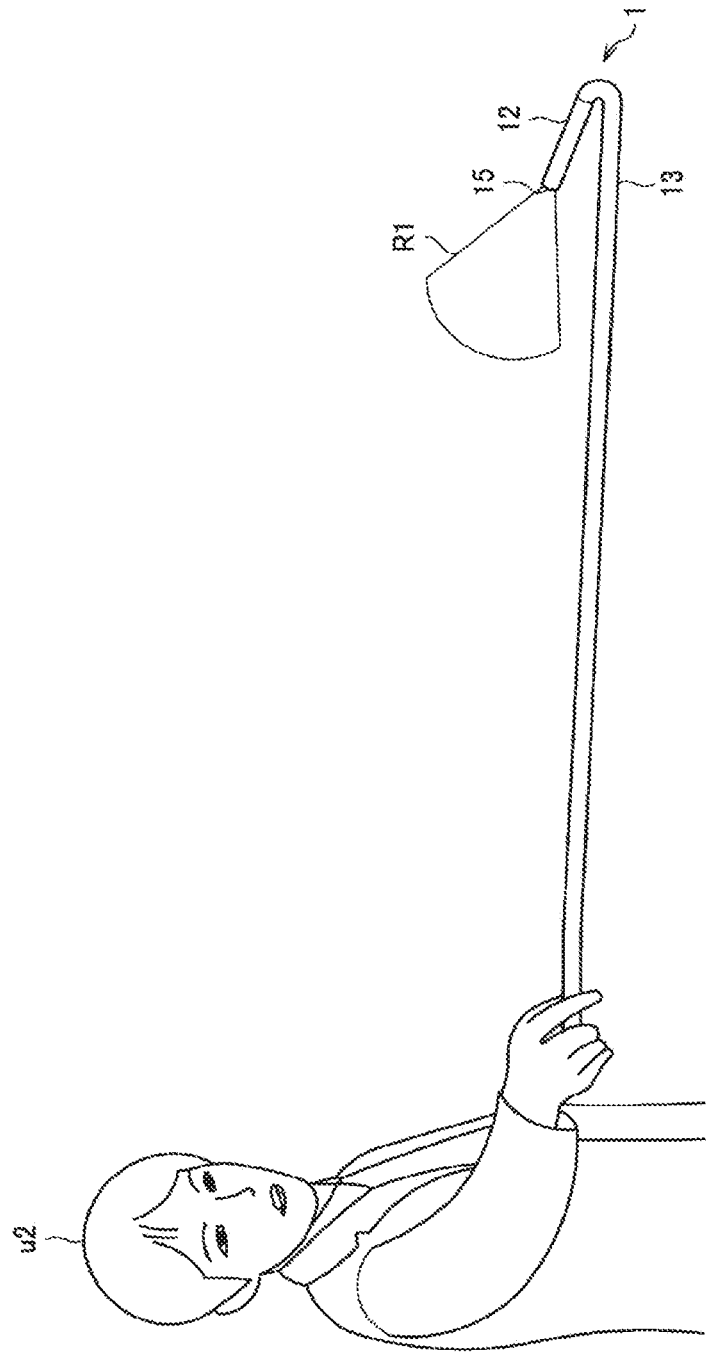
FIG. 25 is an explanatory diagram for describing an application example of an imaging device according to the embodiment.

FIG. 25 is an explanatory diagram for describing an application example of the imaging device 1 according to the present embodiment, and illustrates an example in which the user captures his/her own image through the imaging device 1.

As illustrated in FIG. 25, in a state that the bendable section 13 of the imaging device 1 is stretched, a user u2 can grip the reinforcing section 14 (the end portion opposite to the imaging section 15) and set the reinforcing section 12 in which the imaging section 15 is arranged to be apart from the user. In this state, the user u2 can bend a part of bendable section 13 near the reinforcing section 12 in which the imaging section 15 is arranged, orient the imaging section 15 to face in the user direction, and capture his/her own image.

The change in the shape of the imaging device 1 illustrated in FIG. 25 may be implemented by bending the bendable section 13 manually by the user u2 or may be implemented by driving the drive section 17 automatically by the imaging device 1. As another example, in the imaging device 1, a reflection section such as a mirror may be installed on the front surface of the imaging section 15, and the image of the user u2 may be captured through the imaging section 15 without orienting the imaging section 15 toward the user u2 side.

Further, as a configuration for setting the reinforcing section 12 in which the imaging section 15 is arranged to be apart from the user u2, an elongated (bar-like) member is connected to the end portion of the imaging device 1 opposite to the reinforcing section 12 (for example, the reinforcing section 14 side). Further, at this time, the elongated member may be configured to be expandable and contractible. An operation unit for operating the imaging device 1 (for example, causing the imaging section 15 to capture an image) may be arranged near the portion of the elongated member gripped by the user. Further, the elongated member may be arranged as a part of the imaging device 1 or may be configured as the external unit 2 connected to the imaging device 1.

Figure 26:
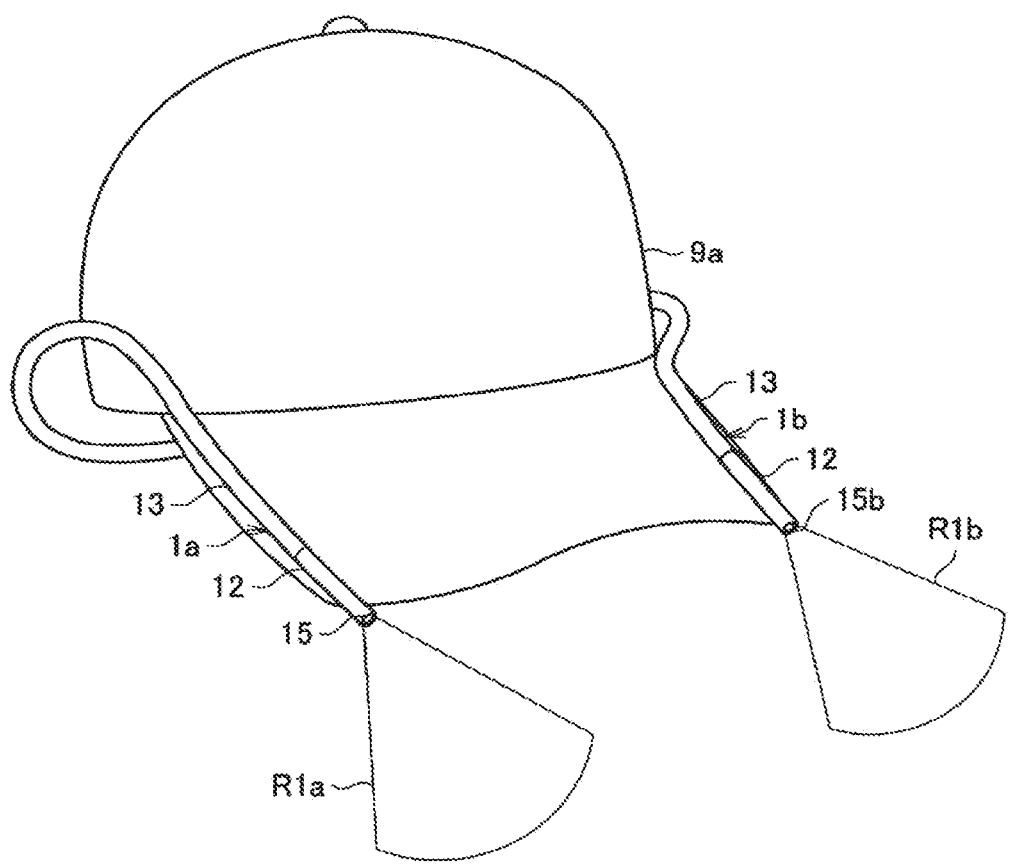
FIG. 26 is an explanatory diagram for describing an application example of an imaging device according to the embodiment.
Figure 27:
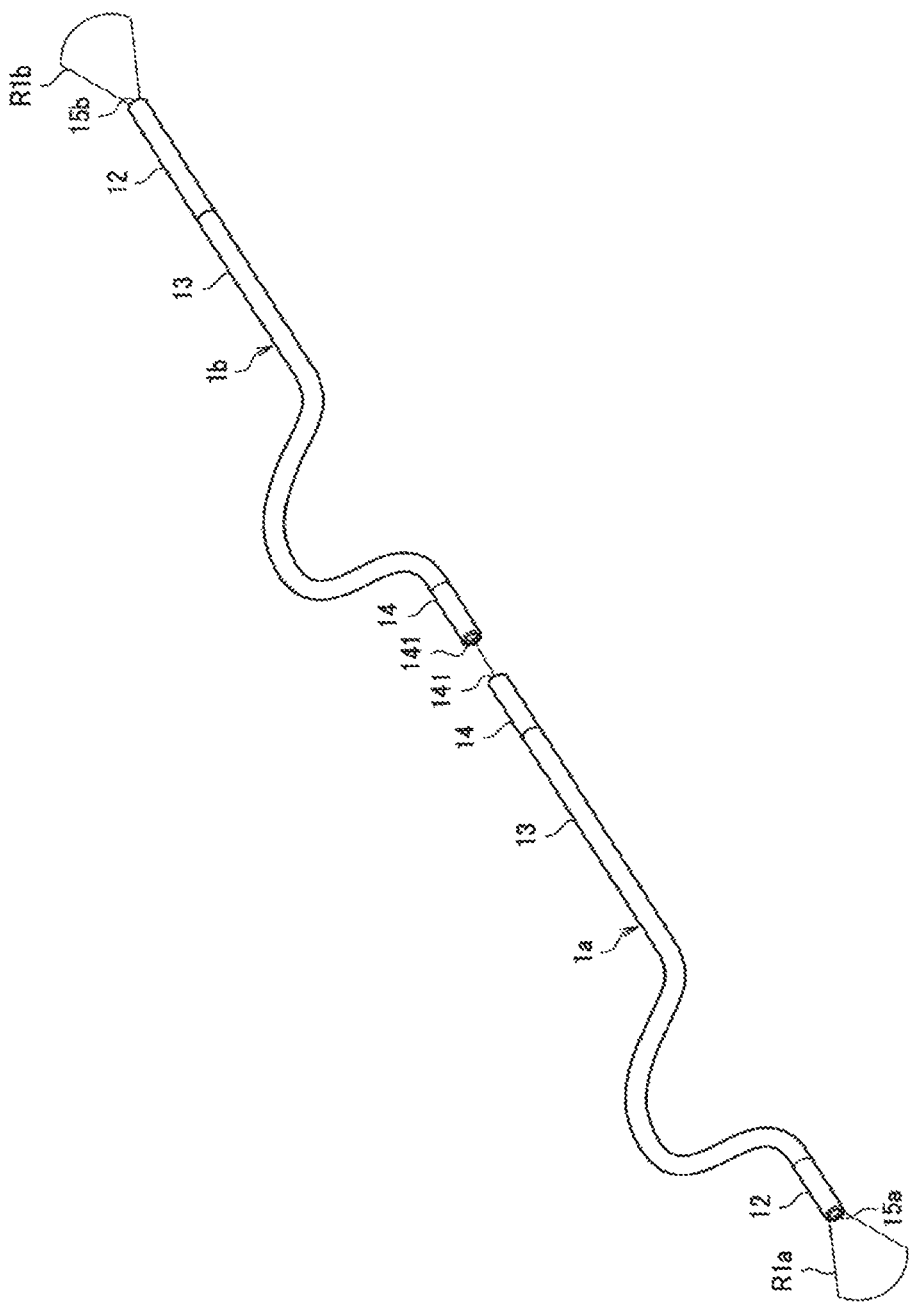
FIG. 27 is an explanatory diagram for describing an application example of an imaging device according to the embodiment.

FIGS. 26 and 27 are explanatory diagrams for describing application examples of the imaging device 1 according to the present embodiment and illustrate examples in which a three-dimensional image is captured using two different imaging devices 1 (hereinafter referred to as "imaging devices 1a and 1b").

For example, in an example illustrated in FIG. 26, the imaging devices 1a and 1b are installed on a cap 9a such that the bent bendable section 13 is used as a holding member, and the reinforcing section 12 in which the imaging section 15 is arranged is held to a brim portion of the cap 9a. At this time, the reinforcing section 12 of the imaging device 1a is held to the right end portion of the brim of the cap 9a (that is, on the left side in FIG. 26), and the reinforcing section 12 of the imaging device 1b is held to the left end portion of the brim of the cap 9a (that is, on the right side in FIG. 26). Through this configuration, the imaging section 15a can capture a parallax image corresponding to the right eye, and the imaging section 15b can capture a parallax image corresponding to the left eye.

Here, FIG. 27 is referred to. FIG. 27 illustrates an example of a connection relation of the imaging devices 1a and 1b illustrated in FIG. 26. As illustrated in FIG. 27, the connection terminal 141 arranged in the reinforcing section 14 of the imaging device 1a is connected to the connection terminal 141 arranged in the reinforcing section 14 of the imaging device 1b. Accordingly, the imaging device 1a and the imaging device 1b can operate in cooperation with each other by performing transmission and reception of information between the connected connection terminals 141.

In other words, as illustrated in FIG. 26 and FIG. 27, the imaging devices 1a and 1b connected to each other are installed on the cap 9a, and the parallax images are captured through the imaging devices 1a and 1b, so that the three-dimensional image can be acquired on the basis of the parallax images.

The application examples of the imaging device 1 according to the present embodiment have been described with reference to FIGS. 23 to 27 using the specific examples.

<4. Conclusion>

As described above, the imaging device 1 according to the present embodiment includes the elongated bendable section 13 which is configured to be bendable, and the imaging section 15 and the circuit section 16 are held in the reinforcing section 12 arranged at the end portion in the longitudinal direction (that is, the axial direction L0) in which the bendable section extends. Through this configuration, the user can use the bendable section 13 as the holding member for holding the imaging section 15 at a desired position or with a desired posture by bending the bendable section 13 in a desired shape. Further, the user can apply the imaging device 1 in forms suitable for various purposes by appropriately bending the bendable section 13 in accordance with the purpose (use scene) of the imaging device 1.

Further, the bendable section 13 is configured to be able to store a power source (for example, a cable battery) for supplying electric power to the imaging section 15 and the circuit section 16. In other words, the imaging device 1 according to the present embodiment can drive the imaging section 15 and the circuit section 16 by supply of electric power from the power source. In other words, the external unit such as the power source for supplying electric power to the imaging section 15 or the operation unit for operating the imaging section 15 need not be necessarily connected to the imaging device 1 when an image is captured through the imaging section 15. Therefore, the imaging device 1 according to the present embodiment is not subject to restrictions associated with the connection of the external unit such as the power source, the operation unit, or the like, and thus the imaging device 1 according to the present embodiment can be applied for various purposes.

Further, the drive section 17 for bending the bendable section 13 may be arranged in the bendable section 13. Through this configuration, for example, the imaging device 1 can autonomously control the direction of the imaging section 15 by properly driving the drive section 17 on the basis of the detection result of the detecting section such as various kinds of sensors.

In the imaging device 1 according to the present embodiment, the reinforcing section 14 is arranged on the end portion opposite to the end portion of the bendable section 13 in which the reinforcing section 12 is arranged, and the connection terminal 141 for connecting the external unit 2 or another imaging device 1 is arranged in the reinforcing section 14. Through this configuration, the imaging device 1 according to the present embodiment can appropriately expand the functions in accordance with the purpose by connecting the external unit 2 in accordance with the purpose. Further, when another imaging device 1 is connected to the imaging device 1 according to the present embodiment, it is also possible to operate a plurality of imaging devices 1 in cooperation with one other.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An imaging device, including:

an elongated bendable section configured to be bendable;

a reinforcing section that is arranged on an end portion of the bendable section in an elongated direction in which the bendable section extends, the reinforcing section having higher rigidity than the bendable section; and an imaging section that is held to be able to capture an image in a predetermined direction with respect to the reinforcing section, in which the bendable section is configured to be able to store a power source in at least a part of the bendable section.

(2)

The imaging device according to (1), in which the bendable section has a characteristic of retaining a deformed shape when the bendable section is deformed and bent by external pressure.

(3)

The imaging device according to (2), in which at least a part of the bendable section is formed of plastic-deformable shape-retaining material.

(4)

The imaging device according to (2) or (3), in which at least a part of the bendable section has a bendable structure.

(5)

The imaging device according to any one of (1) to (4), in which the bendable section includes a drive section configured to bend the bendable section.

(6)
The imaging device according to (5), further including:
a control section configured to control an operation of the drive section such that the bendable section is bent in accordance with a result of detection performed by a predetermined detecting section.

(7)
The imaging device according to (6),
in which the control section performs at least one of
control for bending the bendable section by controlling the operation of the drive section such that a subject is included in an imaging range of the imaging section in accordance with a result of detecting the subject by the detecting section,
control for enlarging an image captured by the imaging section in accordance with the result of detecting the subject by the detecting section, and
control for rotating the image captured by the imaging section.

(8)
The imaging device according to (7),
in which the control section controls the operation of the drive section on the basis of a result of detecting a signal transmitted from a terminal held by the subject.

(9)
The imaging device according to (8),
in which the detecting section includes an antenna having directivity, and
the control section controls the operation of the drive section on the basis of a result of detecting the signal transmitted from the terminal by the antenna.

(10)
The imaging device according to (7),
in which the control section controls the operation of the drive section in accordance with a result of detecting a relative position relation between a first terminal held by the subject and a second terminal different from the first terminal.

(11)
The imaging device according to (7),
in which the control section controls the operation of the drive section on the basis of a result of analyzing the image obtained by imaging the subject.

(12)
The imaging device according to any one of (5) to (11),
in which the drive section is driven on the basis of the control of an external device.

(13)
The imaging device according to any one of (5) to (12),
in which the drive section includes a plurality of drive systems configured to bend the bendable sections in different directions.

(14)
The imaging device according to (13),
in which the drive system includes
a shaft member that is arranged to be perpendicular to a direction in which the bendable section extends,
a plane-like planar member that is held by the shaft member to be perpendicular to the shaft member,
a holding member that is held to be rotatable around the shaft member in a circumferential direction with respect to the shaft member, and
a drive member configured to cause the holding member to rotate in a direction opposite to the circumferential direction relative to the planar member by driving the planar member to rotate in the circumferential direction.

(15)
The imaging device according to (14),
in which the drive member has a shape of a rotator whose axis is a linear direction parallel to at least one surface of the planar member and is held to be rotatable around the linear direction such that at least a part of a side surface of the rotator comes into contact with the one surface.

(16)
The imaging device according to (15),
in which the drive member rotates around the linear direction and drives the planar member to rotate in the circumferential direction by using friction force generated between the side surface of the rotator and the one surface of the planar member.

(17)
The imaging device according to (15),
in which the friction force is obtained by magnetism of the drive member.

(18)
The imaging device according to any one of (14) to (17),
in which the planar member of one drive system among the plurality of drive systems is fixed to the planar member of another drive system.

(19)
The imaging device according to any one of (14) to (18),
in which the drive system includes an encoder configured to measure displacement of the planar member in the circumferential direction.

(20)
The imaging device according to any one of (1) to (19),
in which the power source is stored near the reinforcing section located on a side opposite to the reinforcing section in which the imaging section is held, in the elongated direction.

(20)
The imaging device according to any one of (1) to (19),
in which the power source is stored near the reinforcing section in which the imaging section is held.

REFERENCE SIGNS LIST 1 imaging device
12 reinforcing section
13 bendable section
14 reinforcing section
141 connection terminal
15 imaging section
151 optical system
153 imaging element
16 circuit section
17 drive section
18 antenna
2 external unit
3 information processing terminal
4 signal transmitting terminal

The invention claimed is:
1. An imaging device, comprising:
a lens;
an elongated element including an elongated bendable section, and including the lens integrated into an end portion of the elongated element; and
a drive section disposed within the bendable section to bend the bendable section,
wherein the drive section includes:
a shaft which is perpendicular to a direction in which the bendable section extends;
a planar surface that is perpendicular to the shaft;

a motor; and
a frame which holds the motor, the motor to cause the frame to rotate about the shaft, relative to the planar surface,
wherein the imaging, device further comprises:
a second drive section which includes:
a second shaft which is perpendicular to the direction in which the bendable section extends;
a second planar surface that is perpendicular to the second shaft;
a second motor; and
a second frame which holds the second motor, the second motor to cause the second frame to rotate about the second shaft relative to the second planar surface,
wherein:
said shaft and said second shaft are perpendicular to each other, and
said planar surface and said second planar surface are perpendicular to each.

2. The imaging device according to claim 1, wherein:
the lens faces a horizontal direction.

3. The imaging device according to claim 1, wherein:
the lens faces a direction which is different from a direction which extends upwardly.

4. The imaging device according to claim 1, wherein the elongated element includes an image sensor which received light which has passed through the lens.

5. The imaging device according to claim 4, wherein the elongated element includes a battery integrated therein, the battery supplying power to the image sensor.

6. The imaging device according to claim 1, wherein:
the elongated bendable section includes a circular shaped portion for standing of the imaging device on a surface and a portion which extends upwardly and away from the circular shaped portion, the lens being at the portion which extends upwardly.

7. The imaging device according to claim 6, wherein:
the circular shaped portion is flat for at least 360 degrees.

8. The imaging device according to claim 6, wherein:
the portion that extends upwardly and away from the circular shaped portion includes a vertical portion and a horizontal portion, and
the horizontal portion includes the lens.

9. The imaging device according to claim 1, further comprising:
a driver attached to a motor shaft of the motor, the driver interacting with the planar surface which causes the motor and the frame to rotate as unit about the shaft.

10. The imaging device according to claim 9, wherein:
the driver is a gear.

11. The imaging device according to claim 9, wherein:
the driver interacts and drives relative to the planar surface using friction.

12. The imaging device according to claim 9, wherein:
the driver includes a magnet.

13. The imaging device according to claim 9, further comprising:
an encoder to measure a rotation amount of the frame relative to the planar surface.

* * * * *